US005936662A

United States Patent [19]

Kim et al.

[11] Patent Number: 5,936,662
[45] Date of Patent: Aug. 10, 1999

[54] VIDEO CONFERENCE CONTROL SYSTEM USING AN INTEGRATED SERVICES DIGITAL NETWORK

[75] Inventors: Hyung-Gi Kim, Seoul; Young-Keun Kim, Bucheon; Do Wan-Kim; Chang-Jin Jeong, both of Seoul, all of Rep. of Korea

[73] Assignee: SamSung Electronics Co., Ltd., Kyungki-do, Rep. of Korea

[21] Appl. No.: 08/618,754

[22] Filed: Mar. 20, 1996

[30] Foreign Application Priority Data

Mar. 20, 1995 [KR] Rep. of Korea .......................... 95-5807

[51] Int. Cl.[6] ........................................................ H04N 7/15
[52] U.S. Cl. ............................. 348/15; 348/17; 379/202; 379/93.28; 379/93.21
[58] Field of Search ................ 348/14–20; 379/202–207, 379/93.28–93.37, 93.21, 94, 96–98; 370/260, FOR 113

[56] References Cited

U.S. PATENT DOCUMENTS

| | | |
|---|---|---|
| 4,937,856 | 6/1990 | Natarajan . |
| 4,998,243 | 3/1991 | Kao . |
| 5,003,532 | 3/1991 | Ashida et al. . |
| 5,260,941 | 11/1993 | Wilder et al. . |
| 5,315,633 | 5/1994 | Champa . |
| 5,325,194 | 6/1994 | Natori et al. . |
| 5,365,265 | 11/1994 | Shibata et al. ............................. 348/14 |
| 5,371,534 | 12/1994 | Dagdeviren et al. . |
| 5,392,284 | 2/1995 | Sugiyama ................................... 348/14 |
| 5,404,397 | 4/1995 | Janse et al. .............................. 379/202 |
| 5,418,560 | 5/1995 | Yasuda ..................................... 348/14 |
| 5,434,912 | 7/1995 | Boyer et al. . |
| 5,473,363 | 12/1995 | Ng et al. . |
| 5,473,366 | 12/1995 | Imaeda et al. ............................ 348/14 |
| 5,512,938 | 4/1996 | Ohno ....................................... 379/202 |
| 5,533,112 | 7/1996 | Danneels ................................. 370/260 |
| 5,539,811 | 7/1996 | Nakamura et al. ........................ 348/14 |
| 5,548,591 | 8/1996 | Horikoshi ................................ 370/260 |
| 5,684,527 | 11/1997 | Terui et al. ............................. 379/202 |
| 5,710,591 | 1/1998 | Bruno et al. ............................... 348/15 |

*Primary Examiner*—Forester W. Isen
*Assistant Examiner*—Xu Mei
*Attorney, Agent, or Firm*—Robert E. Bushnell, Esq.

[57] ABSTRACT

A multipoint video conference control system for controlling a video conference system by simultaneously connecting three or more video terminals using an ISDN includes a main controller having main speaker's channel information and specific channel information received from a chair terminal, a MVIP bus for synchronously transmitting/receiving data and a control signal, an H.221 multiplexer for synchronizing a phase detected to H.221 frame synchronization from the data received through the MVIP bus and separating the data to audio and video signals, a video processor for transmitting the separated video signal to a terminal according to an audio level or processing the separated video signal by a video split screen, and an audio processor for selecting terminals of a prescribed number having the loudest voice to sum corresponding audio data or processing conference data per group.

26 Claims, 20 Drawing Sheets

VIDEO CONFERENCE CONTROL SYSTEM USING AN INTEGRATED SERVICES DIGITAL NETWORK

CROSS-REFERENCE TO RELATED APPLICATIONS

This application makes reference to, incorporates the same herein, and claims all benefits accruing under 35 U.S.C. §119 from an application for *Video Conference Control System Using An Integrated Services Digital Network* earlier filed in the Korean Industrial Property Office on Mar. 20, 1995 and assigned Ser. No. 5807/1995.

BACKGROUND OF THE INVENTION

1. Technical Field

The present invention relates to a system for controlling a multipoint conference, and more particularly to a video conference control system using an integrated services digital network (ISDN) for providing a video conference involving at least three or more video terminals.

2. Background Art

A video conference system is an advanced multimedia system in which a conversation or video conference is made among distant locations in order to quickly transmit information and to reduce both time and cost of business trip. Traditionally, a video conference is established between two terminals on a point-to-point basis. Each terminal, that is, each conference room, includes a microphone for generating an audio signal for transmission to the other terminal, a receiver for receiving an audio signal form the other terminal, a video camera for generating a video signal for transmission to the other terminal and a display device for display a video signal generated at the other terminal. Each terminal also includes a conference control unit which controls the coding of the video signal and the audio signal for transmission in a compressed fashion to the other terminal and for decoding a coded video signal and audio signal received from the other terminal. The conference control unit typically realizes an interactive conference between two terminals.

As advances in digital compression and availability of international standards and digital networks are made in recent years, there is a demand to realize a multi-point video conference system which enables a conference among three or more terminals. Typically, the conventional multi-point video conference system as disclosed, for example, in U.S. Pat. No. 5,003,532 for *Multi-Point Conference System* issued to Ashida et al., U.S. Pat. No. 5,315,633 for *Digital Video Switch For Video Teleconferencing* issued to Champa, and U.S. Pat. No. 5,325,194 for *Multipoint Video Conferencing System* issued to Natori et al, is implemented using a centralized multipoint control unit (MCU) connected through a star network to conference room terminals provided in each terminal. The multipoint control unit (MCU) carries out selection and distribution of images, mixing of voices, and centralized control of a whole system.

The MCU automatically selects a conference room, for example, where a speaker is present, as a master terminal by detecting a speech signal, and distributes an image of the master terminal to other participating terminals. To the master terminal, an image of a secondary participating terminal is distributed. The MCU then automatically sets a new master terminal in response to a request from an arbitrary terminal prior to receiving the request as a new secondary terminal and sets all terminals other than the new master and secondary terminals as new participating terminals. Such a conventional multi-point video conference system, however, requires a complex internal bus structure which restricts the transmission speed of the communication. Moreover, it has been my observation that T1-class leased line is necessarily used as a line interface in the conventional multipoint video conference system for interfacing participating terminals. This T1-class leased line interface, however, requires costly installation. Further, the conventional multipoint video conference system does not conform to international standards which make it less compatible with other communication terminals.

Recent improvement over the conventional multipoint video conference system in which the use of MCU is avoided is disclosed, for example, in U.S. Pat. No. 5,365,265 for *Multipoint Teleconference System Employing Communication Channels Set In Ring Configuration* issued to Shibata et al. In Shibata '265, an integrated services digital network (ISDN) as stipulated in the International Telegraph and Telephone Consultative Committee Recommendation (CCITT) I-Series is used as line interface in order to reduce cost while concomitantly improving the transmission speed of the communication in the system. While the multipoint video conference system of Shibata '265 has merits in its own right, it is my opinion that further improvements can be contemplated to reduce installation cost of line interface and to simplify the internal data bus structure.

SUMMARY OF THE INVENTION

Accordingly, it is therefore an object of the present invention to provide an improved multipoint video conference control system which facilitates the efficient processing of the transmission speed of communications through a standardized internal bus.

It is another object of the invention to provide an improved multipoint video conference control system which saves installation cost of interface devices by using an integrated services digital network as line interface.

It is a further object of the invention to provide an improved multipoint video conference control system which is compatible with other video conference terminals by the standardization of a processing system.

In accordance with one aspect of the invention, a video conference control system for controlling a video conference by simultaneously connecting three or more video terminals using an ISDN which includes a main controller having main speaker's channel information and specific channel information received from a chair terminal, a MVIP bus for synchronously transmitting/receiving data and a control signal, an H.221 multiplexer for synchronizing a phase detected to H.221 frame synchronization from the data received through the MVIP bus and for separating the data to audio and video signals, a video processor for transmitting the separated video signal to a terminal according to an audio level or for processing the separated video signal by a video split screen, and an audio processor for selecting terminals of a prescribed number having the loudest voice to sum corresponding audio data or for processing conference data per group.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
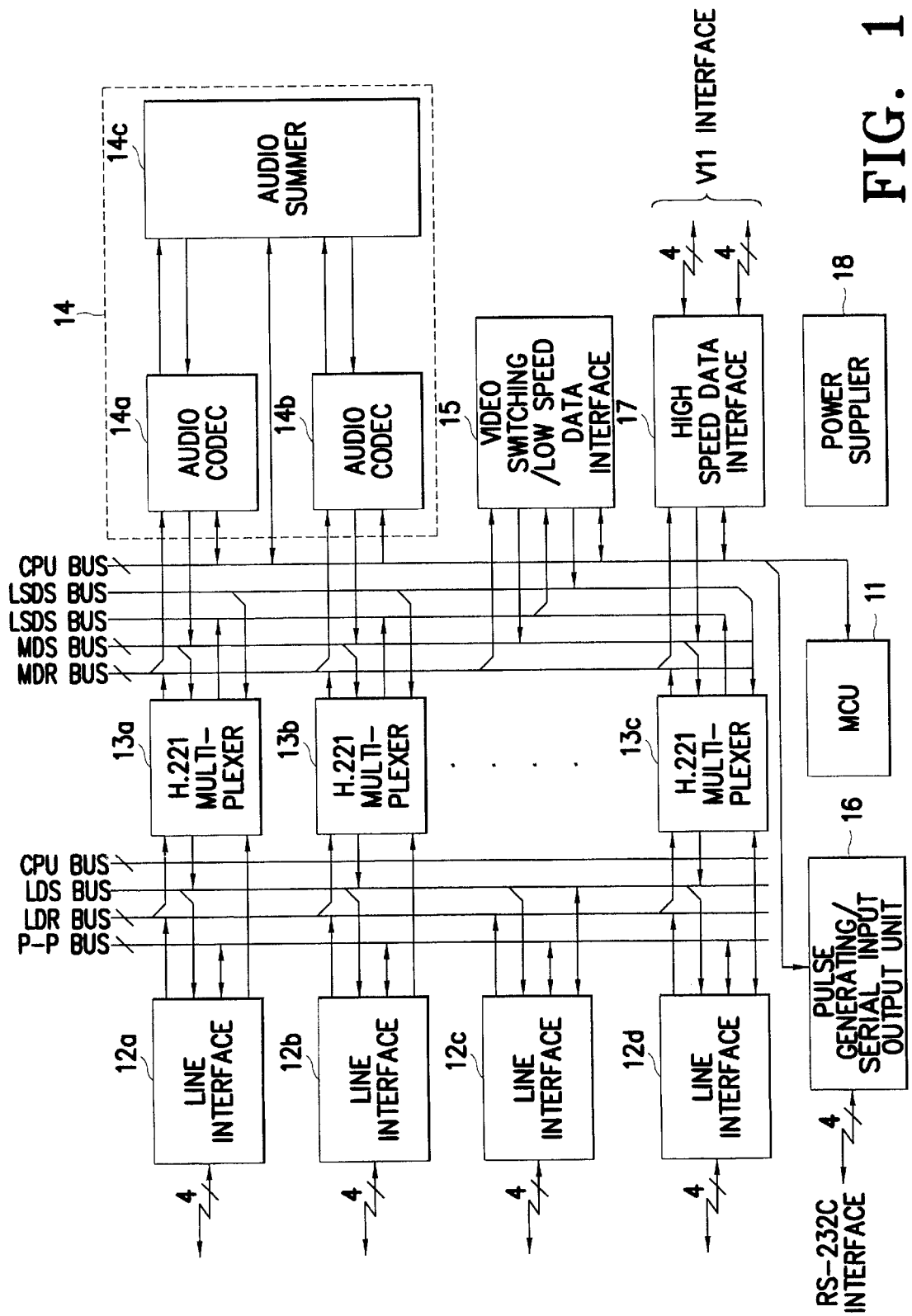
FIG. 1 is a block diagram showing a construction of a conventional multipoint video conference control system.

Referring now to the drawings and particularly to FIG. 1, which illustrates a conventional multipoint video conference system. The conventional multipoint video conference system includes a master controller unit (MCU) 11, line interfaces 12a–12d, H.221 multiplexers 13a–13c which are multiplexers as stipulated in CCITT Recommendation H.221, an audio mixer 14, a video switching/low speed data interface 15, a pulse generating and serial input/output unit 16, a high speed data interface 17, and a power supplier 18.

The MCU 11 consists of a 16-bit microprocessor, a random-access-memory (RAM), a read-only-memory (ROM), a real time clock, etc., and controls the whole operation of the multipoint video conference system. The line interfaces 12a–12d consist of a line interface unit having a line interface converting function, a frame allocator for frame synchronization or speed conversion, and a memory time switch operated as a temporal-spatial switch. If an video or audio signal is received from a participating terminal through the line interface unit, the frame allocator detects frame synchronization to generate a 2 Mbps signal. The memory time switch exchanges a time slot to be transmitted to a point-to-point (P-P) bus or a line data receive (LDR) bus. If, on the other hand, a video or audio signal of the P-P bus or a line data send (LDS) bus is transmitted to a participating terminal, that signal is transmitted through the line interface unit, the frame allocator and the memory time switch. The P-P bus is a data bus for a point-to-point conference. The LDS and LDR buses are data buses for a multipoint conference. The H.221 multiplexers 13a–13c detect H.221 frame synchronization from a data column of a participating terminal received through the LDR bus, synchronizes a frame phase to a MCU internal timing, and separates a service channel signal of high speed or low speed data of an audio or video signal. A data format of the separated high speed data of the audio and video signals is converted and then is transmitted to a multiplexed data receive (MDR) bus or a low speed data send (LSDR) bus. A signal from a low speed data send (LSDS) bus and the service channel signal are multiplexed to a multiplexed data send (MDS) bus and transmitted to the line data send (LDS) bus. The audio mixer 14 for mixing an audio signal provided from each terminal has audio codecs 14a and 14b, and an audio summer 14c. The video switching/low speed data interface 15 converters a video signal, and transmits/ receives low speed data. That is, the video switching/low speed data interface 15 receives the video signal from the MDR bus and transmits the video signal of a transmitting terminal to the MDR bus of a receiving terminal. Such a conventional multipoint video conference control system, however, requires a complex internal bus structure which restricts the transmission speed of the communication. Moreover, the T1-class leased line is necessarily used as a line interface in the conventional multipoint video conference system for interfacing participating terminals. This T1-class leased line interface, however, requires costly installation. Further, the conventional multipoint video conference system does not conform to international standards which make it less compatible with other communication terminals.

Figure 2:
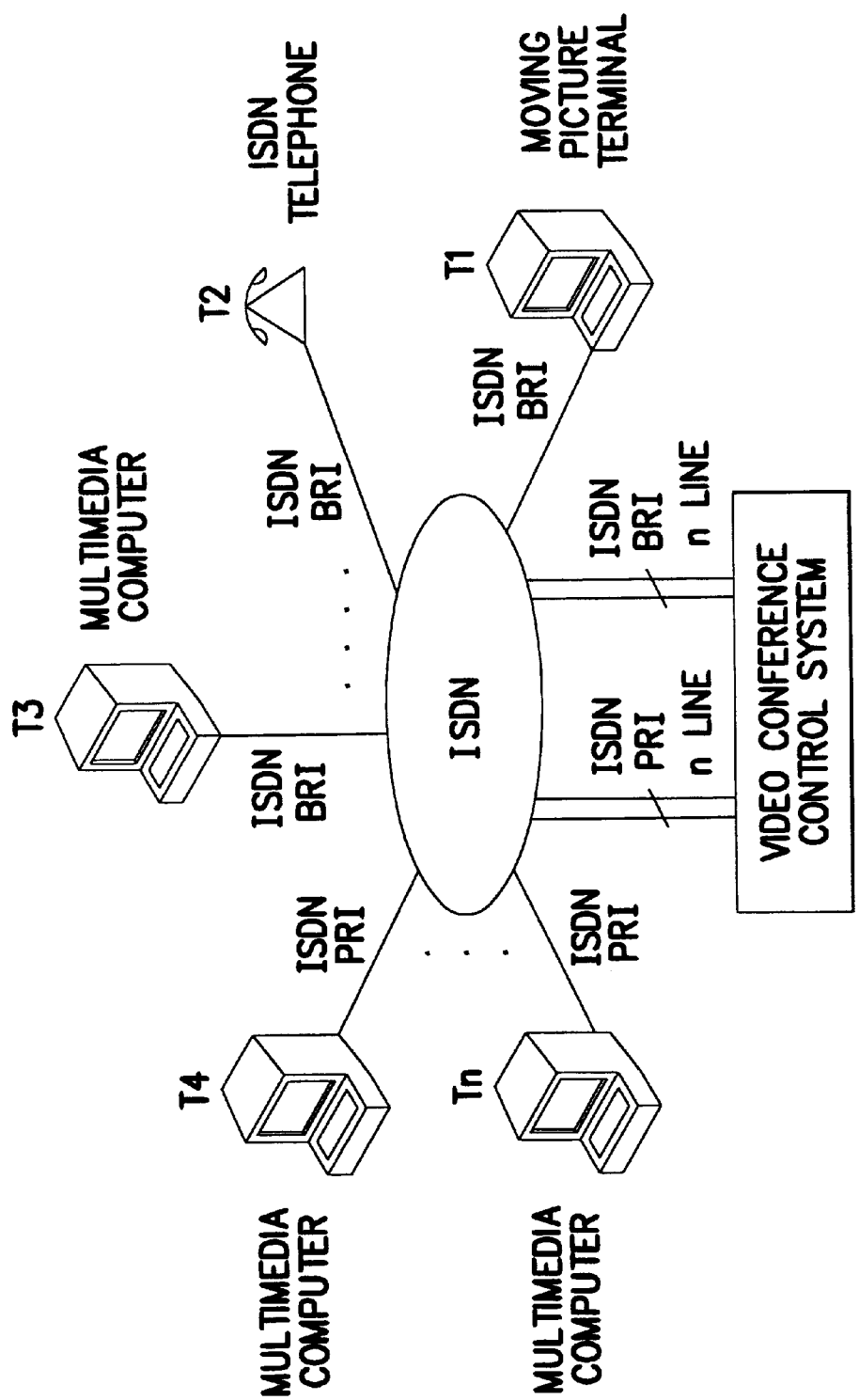
FIG. 2 illustrates a construction of a multipoint video conference control system and participating terminals using an integrated services digital network (ISDN) according to the present invention.

Turning now to FIG. 2, which illustrates a multipoint video conference control system is connected to various participating terminals using an Integrated Services Digital Network (ISDN) as contemplated by the present invention. The multipoint video conference control system as constructed according to the principles of the present invention is connected to video conference terminals such as a moving picture terminal T1, an ISDN telephone T2, and multimedia computers T3-Tn are through an integrated services digital network in order to control operation of selected individual video conference terminals. The participating terminals which are connected to the ISDN contain a frame structure described in CCITT recommendation H.221, and are connected to the ISDN by a typical user network interface (UNI). A transmission rate used in connection with each participating terminal connected to the ISDN is an ISDN basic rate interface (BRI) or a primary rate interface (PRI). A master control unit (MCU) is also coupled to the ISDN through a BRI or PRI line. However, it is not necessary to place the MCU only at an exchange connected to the video conference terminal. The MCU and each video terminal observe standards stipulated in CCITT recommendation H.230, H.231, H.242, H.243, H.261, etc.

A video conference is typically classified into two types; the first type relates to a reservation video conference, and the second type relates to a terminal request video conference. In the reservation video conference, telephone numbers of video terminals which are to participate in a video conference are previously registered in the MCU. The video conference can be called by dialing the number-registered terminals. In the terminal request video conference, by contrast, a video terminal which requests the video conference sequentially connects terminals which are to join the video conference through the MCU. In such case, the terminal which requests the video conference dials the MCU and telephone numbers of the terminals which are to participate in the conference are transmitted through a D channel of the ISDN. The MCU receiving the telephone numbers sequentially dials each terminal. Thus, the MCU serves as a video conference switch for providing a video conference between the connected video terminals and controls the video conference.

Figure 3:
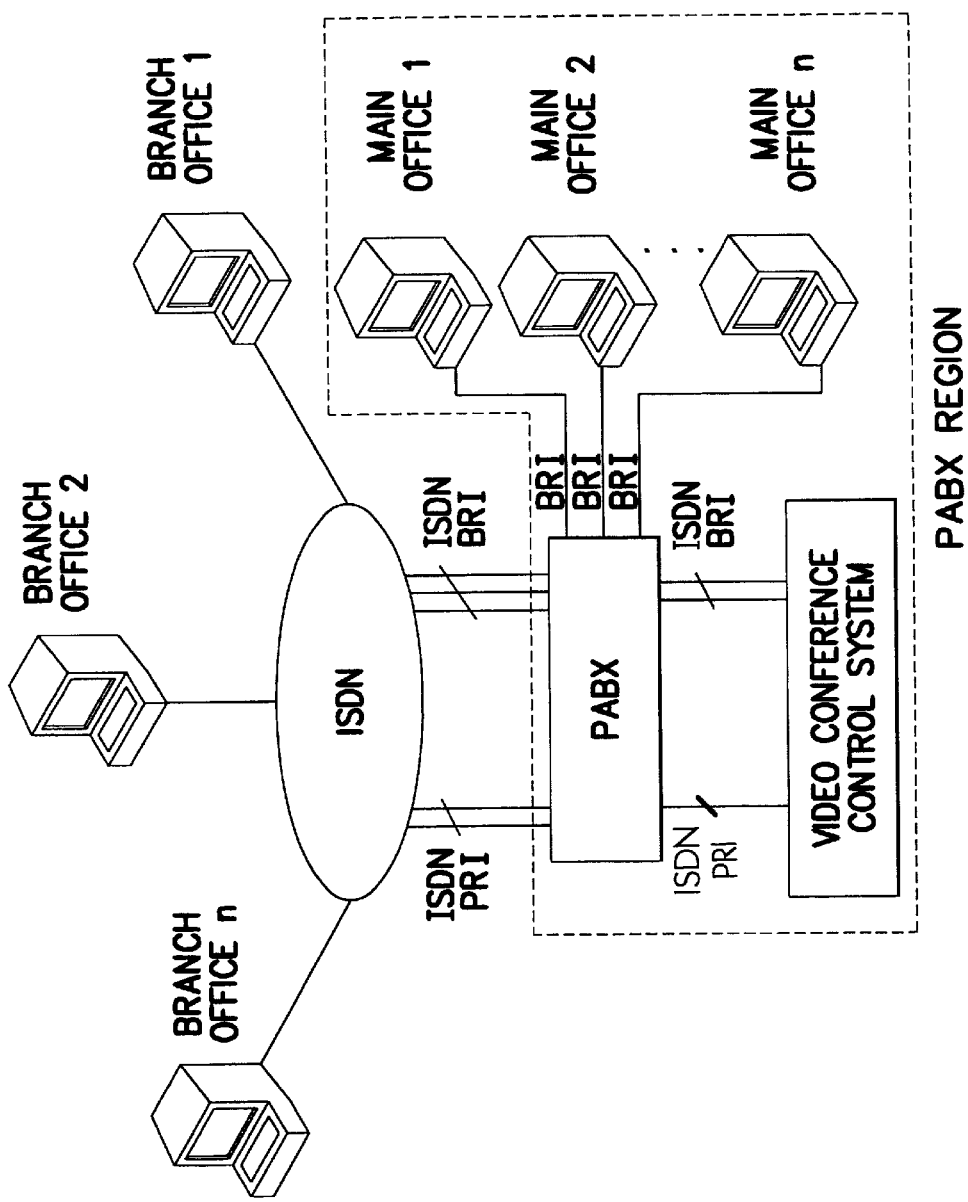
FIG. 3 illustrates one example of a multipoint video conference system using a private automatic branch exchange (PABX) connected to an integrated services digital network (ESDN)

FIG. 3 illustrates one example of a video conference control system using a private automatic branch exchange (PABX) connected to the ISDN. The PABX is connected to the configuration of FIG. 2 in order to provide the video conference between terminals within a PABX region. At the same time, the video conference with external terminals can also be obtained. For example, assuming that the PABX region is a main office, video terminals connected to the ISDN may be selected as branch offices. The PABX is variably connected to the ISDN through the ISDN BRI or PRI interface according to the size of the system. The MCU takes an ISDN connecting form similar to the PABX.

Figure 4:
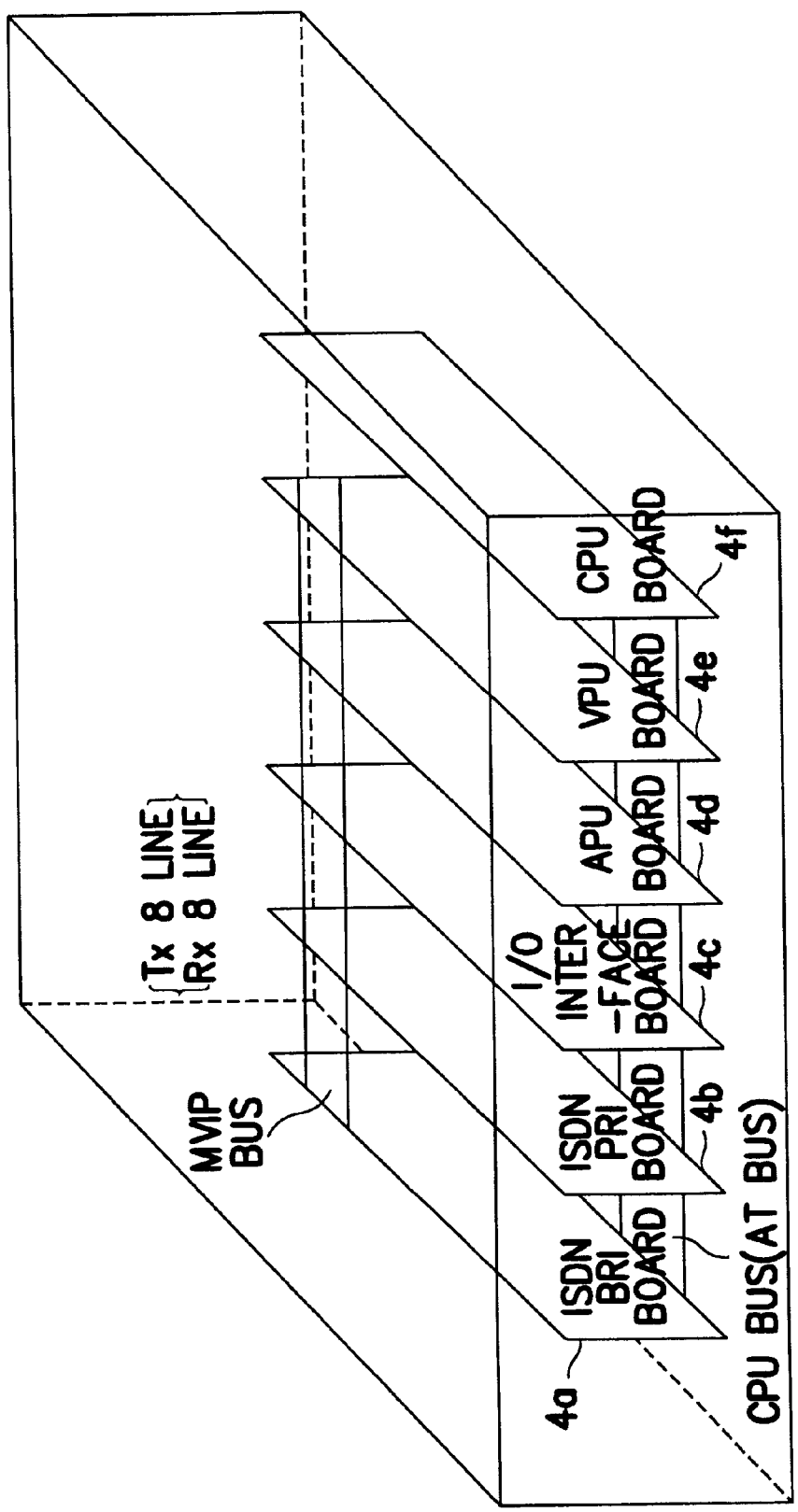
FIG. 4 illustrates a hardware construction of an improved multipoint video conference control system according to the present invention.

FIG. 4 illustrates a hardware construction of the video conference control system according to the present invention. The video conference control system is constructed by an ISDN BRI board 4a, an ISDN PRI board 4b, an input/output (I/O) interface board 4c, an audio processing unit (APU) board 4d, a video processing unit (VPU) board 4e and a central processing unit (CPU) board 4f. An industry standard architecture (ISA) bus is used for exchanging control data between the CPU board 4f performing command and indication (C&I), data processing and system maintenance and other boards. Transmitted data is non-real time control data. A multiple vendor integration protocol (MVIP) bus is used for transmitting data received from the video terminal, such as audio and video data between boards. There is no need to connect the CPU board 4f to the MVIP bus.

Figure 5:
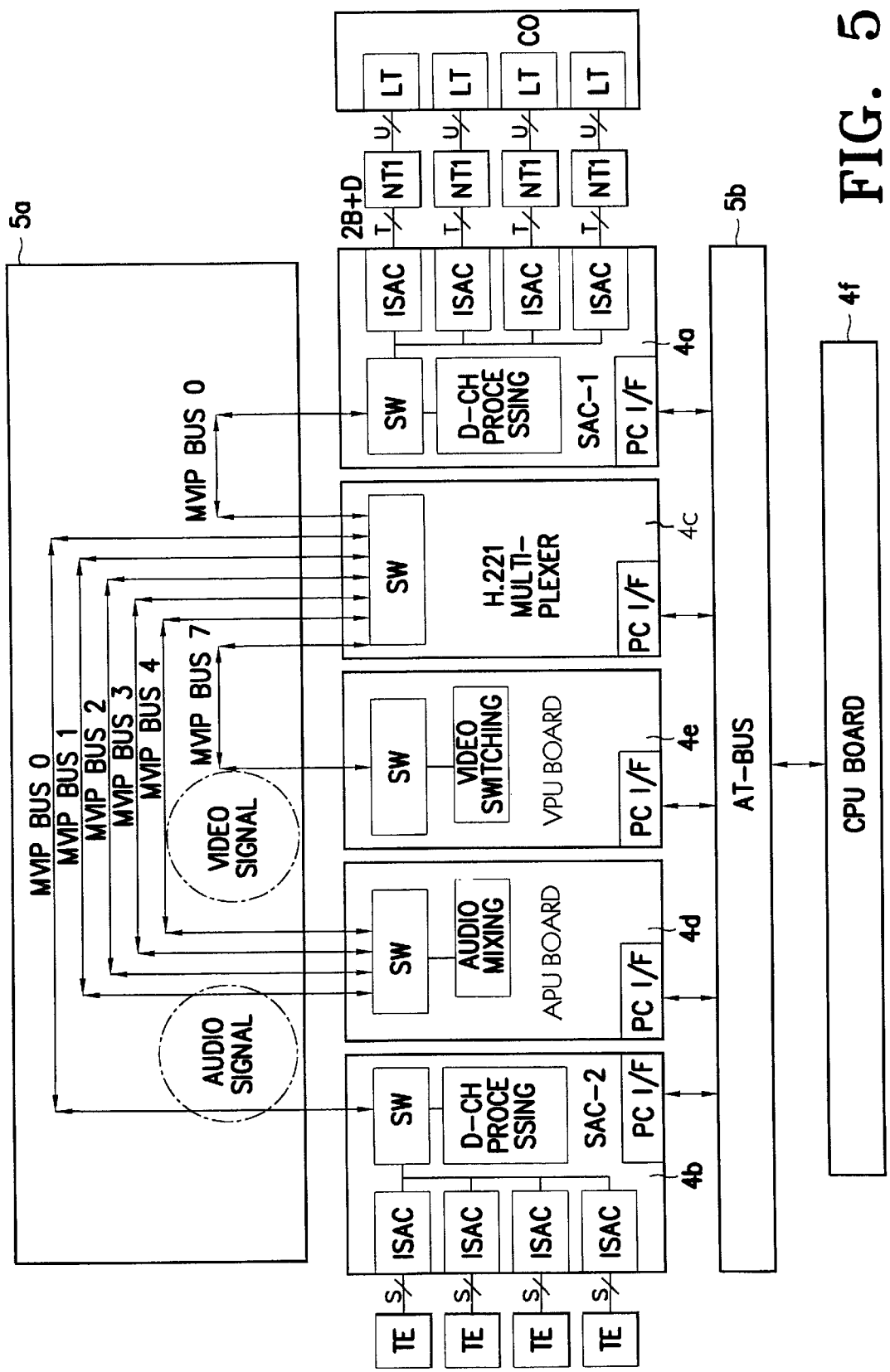
FIG. 5 illustrates a multiple vendor integration protocol (MVIP) bus connection state of the video conference control system constructed according to the present invention.

Referring to FIG. 5, each board of the video conference control system of FIG. 4 such as the ISDN BRI board 4a, the ISDN PRI board 4b, the input/output (I/O) interface board 4c corresponding to the H.221 multiplexer board, the audio processing unit (APU) board 4d, a video processing unit (VPU) board 4e and a central processing unit (CPU) board 4f is connected to the MVIP bus in order to exchange video and audio data, and the CPU board 4f is connected to the other boards through an AT bus 5b. A subscriber access controller (SAC) connected to the ISDN BRI line connects the multipoint terminals with one another according to a connection procedure stipulated in ITU-T Q.931 by receiving a signal from the terminal or dialing the terminal by D channel processing. An ISDN SAC (ISAC) for ISDN 'S/T' interface restores system framing and clock sent to 'S/T' interface after a network terminator (NT) extracts timing through 'U' interface from the exchange. The data received in the form of a 2B+D basic rate service (two B bearer channels and a packetized D signaling channel) from the ISDN is transmitted to a temporal-spatial switch SW. The multipoint terminal connection is implemented by the temporal-spatial switch SW within the SAC and can replace "any input stream: channel" with "any output stream: channel". The temporal-spatial switch SW is connected to a MVIP bus 5a to exchange a signal with the H.221 multiplexer board 4c.

As shown in FIG. 5, one ISDN "S" interface card contains 4-line 'S' interface cards and one PC ISA bus can install up to 3 ISDN "S" interface cards. A SAC-1 4a connected to a 'T' line operates as a line terminator (LT)-T mode and is used to provide a simultaneous multipoint video conference with the moving picture terminal connected to the ISDN. A SAC-2 4b connected to a 'S' line operates as a line terminator (LT)-S mode and is used to provide a simultaneous video conference between the moving picture terminals connected within a transmission distance 200 M. A PC AT bus 5b and the MVIP bus 5a are used for real time audio/video signal processing. The PC AT bus 5b supplies power and processes a system control signal. Data and a control signal between the boards are transmitted through a synchronizing data bus provided to the MVIP bus 5a.

Figure 6:
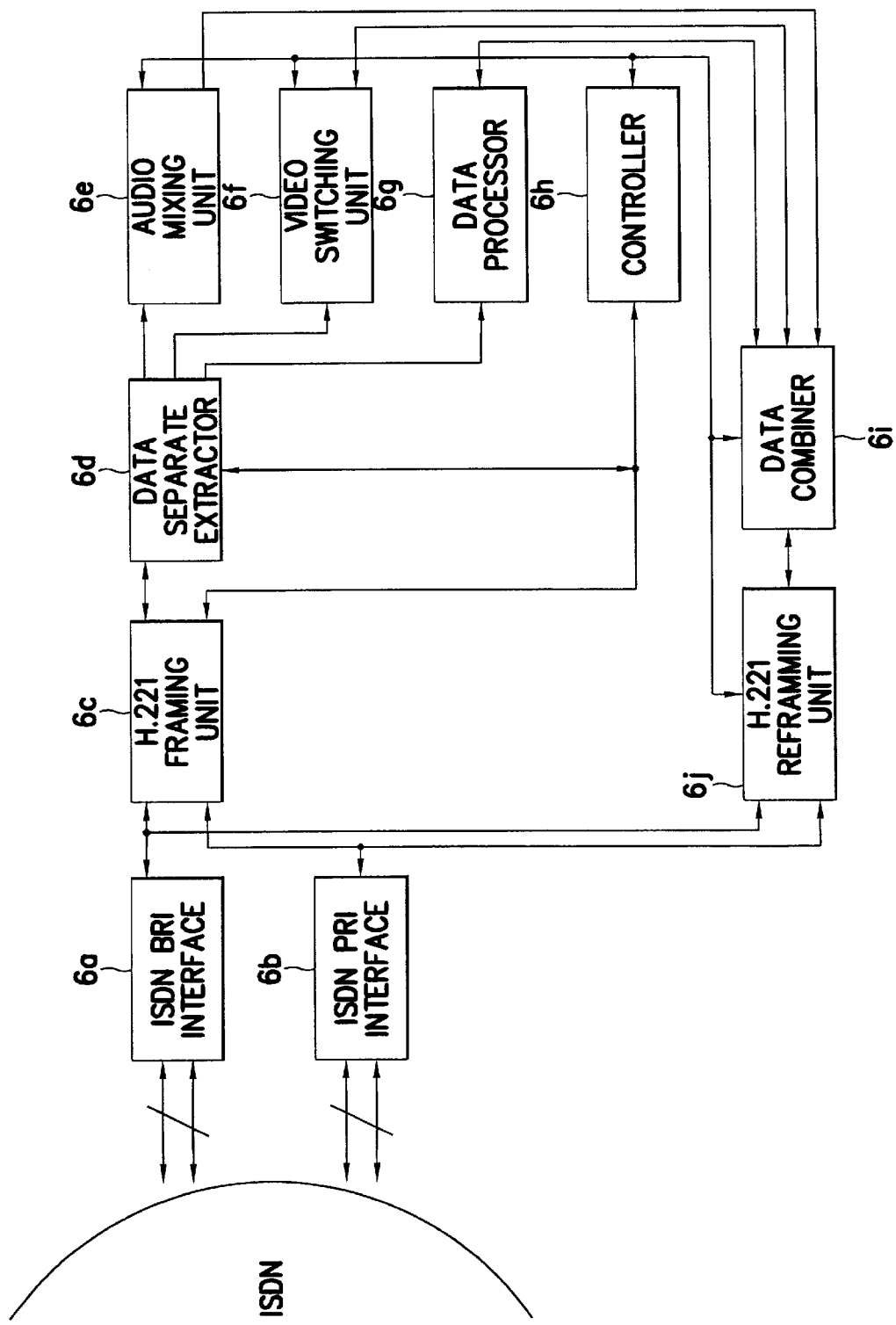
FIG. 6 is a functional block diagram of the video conference control system constructed according to the present invention.

FIG. 6 is a functional block diagram of the video conference control system constructed by the ISDN BRI board 4a, the ISDN PRI board 4b, the input/output (I/O) interface board 4c, the audio processing unit (APU) board 4d, the video processing unit (VPU) board 4e and the central processing unit (CPU) board 4f as shown in FIG. 5. Referring to FIG. 6, a data line connecting each portion is the MIVP bus. Line interfaces 6a and 6b perform a signal processing procedure according to ITU-T Q.931 in order to connect the video conference control system to the ISDN. Only either the BRI interface 6a or the PRI interface 6b may be used. An H.221 framing unit 6c establishes a frame by searching for a frame structure defined in the CCITT Recommendation H.221 and synchronizes a frame alignment signal (FAS) and a bit rate allocation signal (BAS). A data separate extractor 6d is a demultiplexing module for extracting a signal consisting of synchronized audio data, video data and other data to respective independent data. An audio mixing unit 6e including an energy measurer and a mixer extracts and mixes terminals having large audio energy from an audio signal received from the data separate extractor 6d. A video switching unit 6f extracts and supplies an image of a desired terminal from the image of each terminal received from the data separate extractor 6d. A data processor 6g processes data received from the data separate extractor 6d. A controller 6h controls input/output according to a control code received from the H.221 framing unit 6c and controls the whole operation of the multipoint video conference control system in order to control the video conference by CCITT recommendation H.231, H.242 and H.243. A data combiner 6i is a multiplexing module used to combine the data processed from the modules 6e, 6f and 6g to one data structure. An H.221 reframing unit 6j re-converts the data received from the data combiner 6i to data with an H.221 frame structure. After that, the converted data is then transmitted to the ISDN through the line interface 6a or 6b.

Figure 7:
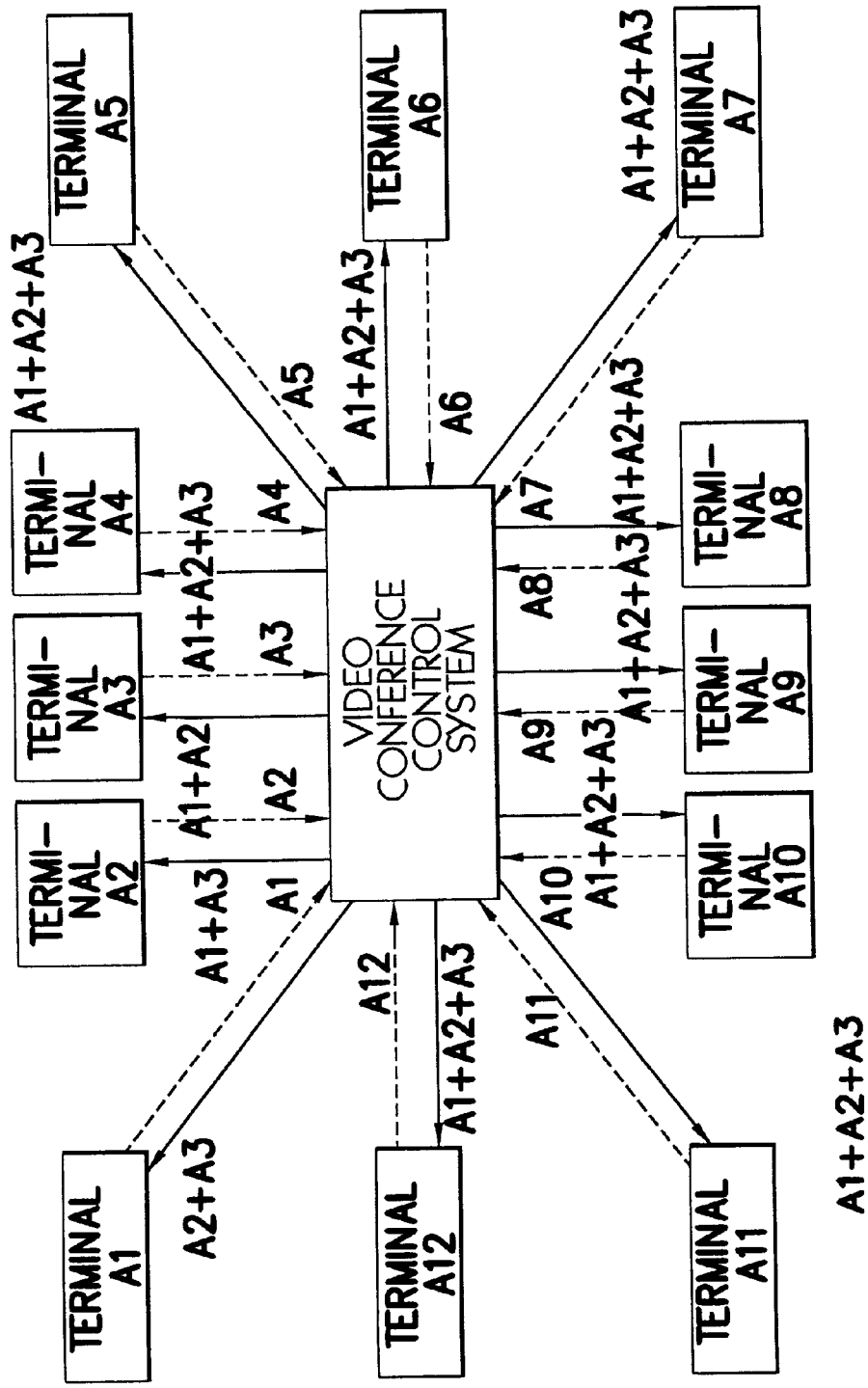
FIG. 7 illustrates one example of a transmission format of audio data when twelve video conference terminals are used.

FIG. 7 illustrates a transmission format of audio data when twelve (12) terminals are used. As shown in FIG. 7, an audio level of each terminal is measured and three (3) terminals having the loudest voice are selected. The video of three (3) terminals are mixed and then transmitted to each participating terminal.

Figure 8:
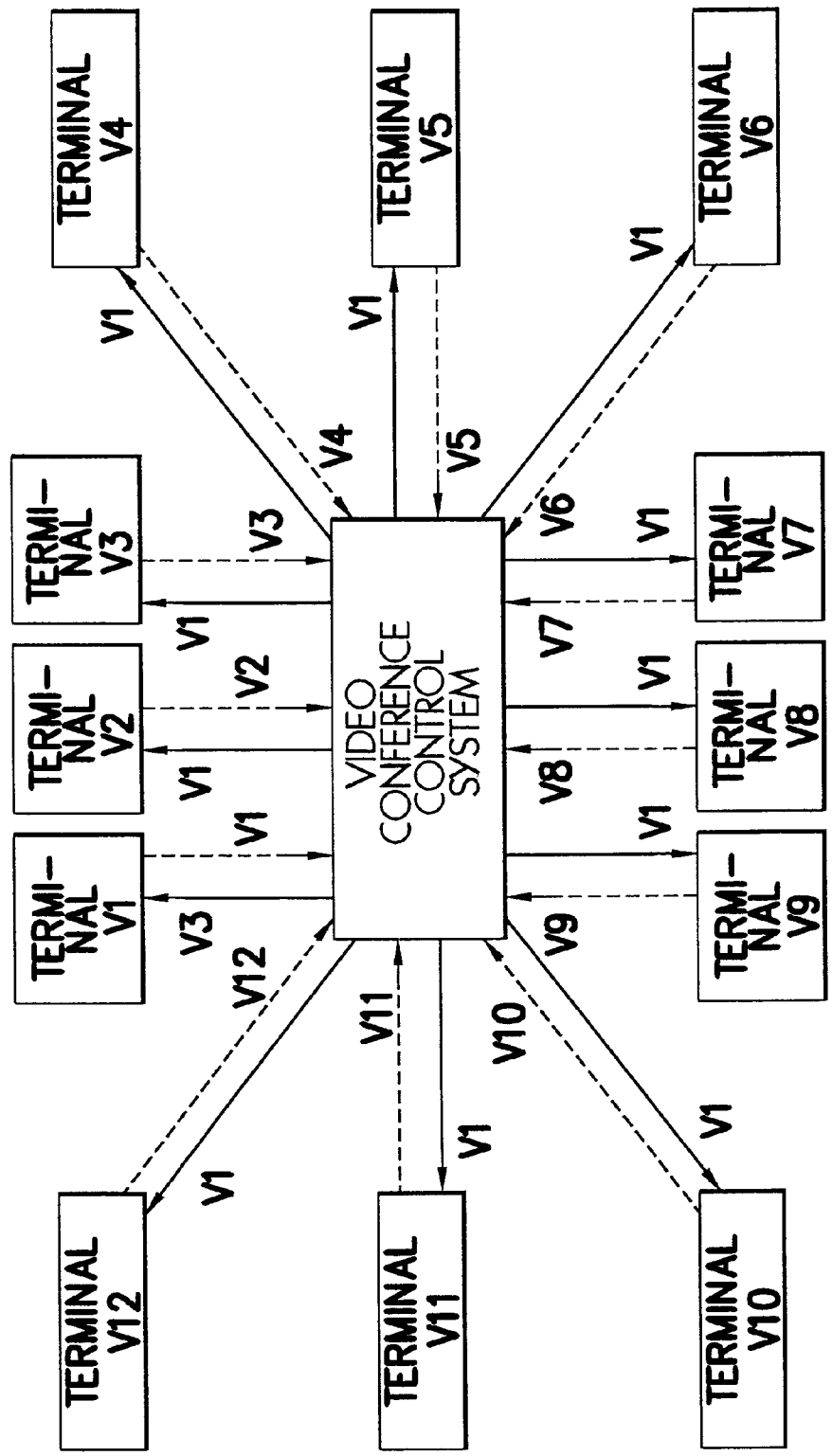
FIG. 8 illustrates one example of a transmission format of video data when twelve video conference terminals are used.

FIG. 8 illustrates a transmission format of video data when twelve (12) terminals are used. As shown in FIG. 8, the video data is allocated to each channel of a MVIP bus 7 (DSo7) as will be described in FIGS. 19A–19B and 20A–20B. The level of an audio signal of each terminal is compared to a reference signal to judge whether a speaker or a non-speaker is present at the terminal. The image of the terminal in which a speaker is determined to be present is transmitted to all the terminals.

Figure 9:
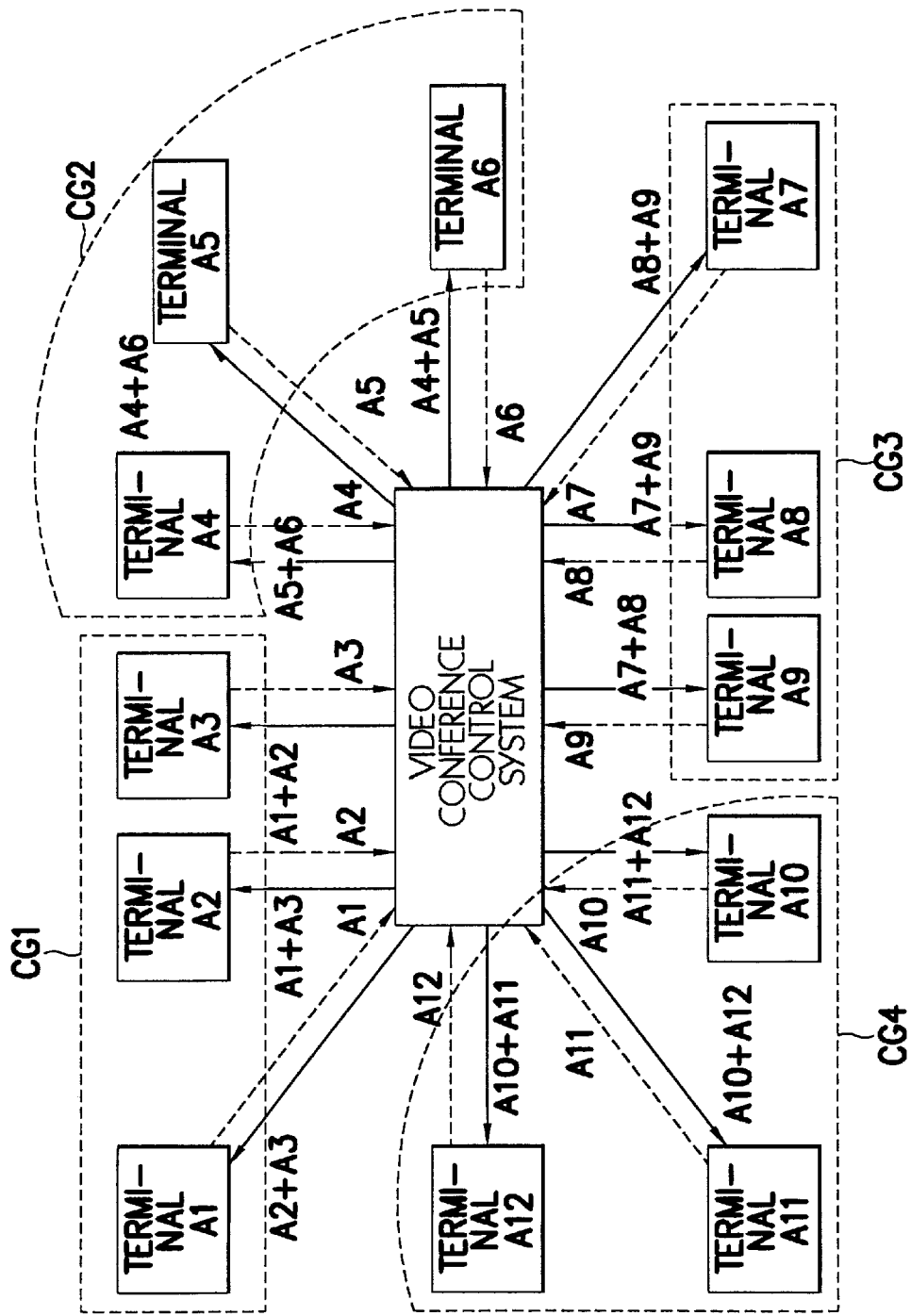
FIG. 9 illustrates another example of a transmission format of audio data when four conference groups each having three video conference terminals participate in a video conference.

FIG. 9 illustrates a transmission format of audio data when four (4) conference groups each conference group having three (3) terminals participate in a video conference. Each stream of the MVIP bus is allocated to a conference group. That is, MVIP bus streams DSo1, DSo2, DSo3, and DSo4 are respectively allocated to first, second, third and fourth groups CG1–CG4.

Figure 10:
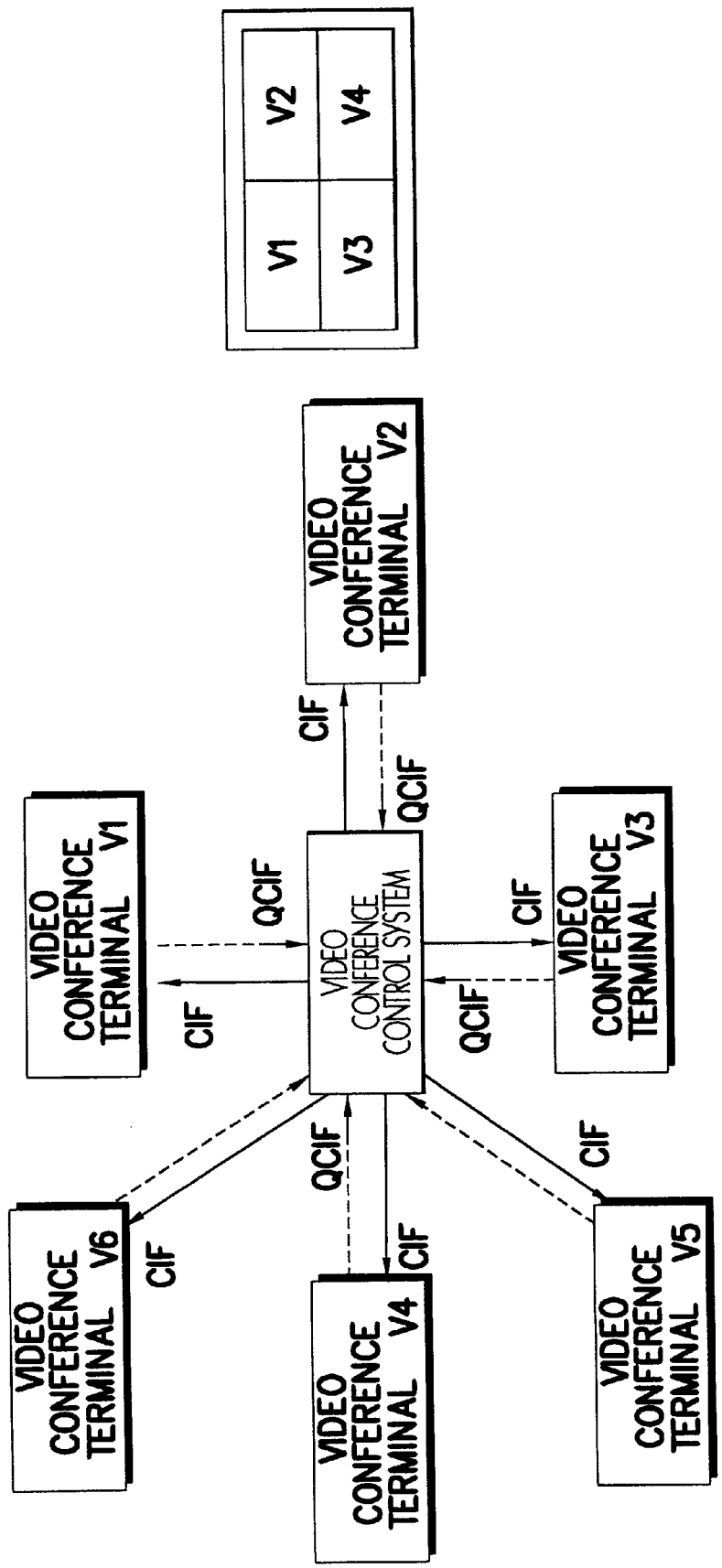
FIG. 10 illustrates a split screen construction in which four quarter common intermediate format (QCIF) images constitute one common intermediate format (CCIF) image.

FIG. 10 illustrates a video split screen in which four (4) quarter common intermediate format (QCIF) images constitute one common intermediate format (CIF) image. When mixing a split screen image, the output of a video conference terminal is set to a QCIF mode and the input thereof is set to a CIF mode. Four QCIF video data signals received to the video switching unit 6f are mixed to a CIF video data signal to be transmitted to each video conference terminal. The four (4) separated images are then displayed on one split screen. The CIF and QCIF of an H.261 video conference has a hierarchical structure of video block, groups of block (GOB), and MACRO block. The CIF is a video signal converting a signal by television broadcasting system such as NTSC, PAL and SECAM into an international common video signal. The horizontal and vertical resolution of the QCIF is half of that of the CIF for an operation at a low bit rate. If an apparatus having the CIF capability is connected to an apparatus having the QCIF capability, the communication is accomplished by the QCIF. An optical luminance signal Y of the CIF is 360 pixels×288 lines, and the horizontal and vertical resolution of color difference signals Cb and Cr is half the luminance signal. The number of frames per second is 30,000/1,001 (about 29.97). The CIF is not interlaced and the luminance of each pixel is displayed by 8 bits (256 levels).

Figure 11:
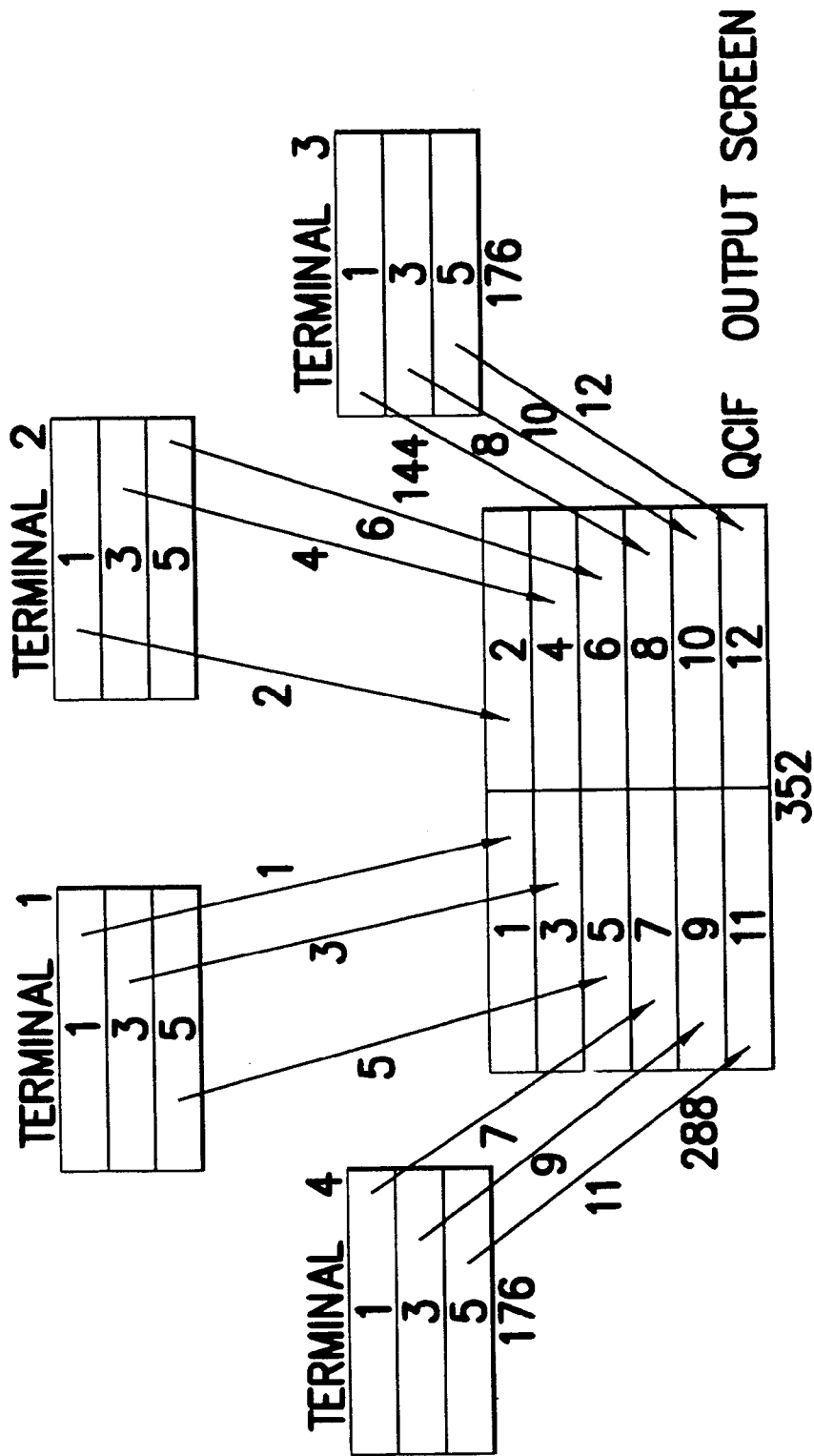
FIG. 11 illustrates a re-allocated block group number for achieving the format conversion of FIG. 10.

FIG. 11 illustrates the reallocation of a block group number for achieving the format conversion of FIG. 10. If the QCIF video data from each terminal is converted to the CIF video data, the split screen video mixing can be accomplished.

Figure 12A:
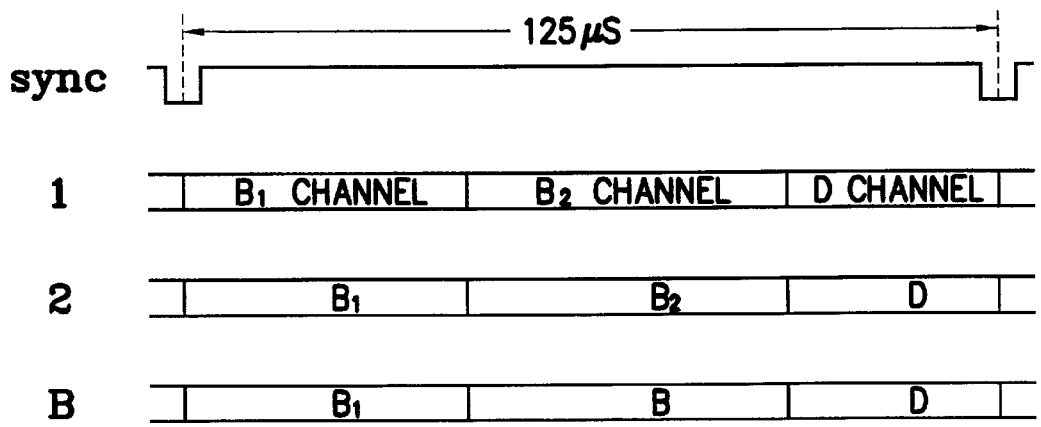
FIGS. 12A and 12B are timing charts for connecting ISDN BRI lines to a MVIP BUS within a MCU system.
Figure 12B:

FIGS. 12A and 12B show a timing chart for connecting the ISDN BRI lines to the MVIP bus within the MCU system. The MVIP bus has 32 channels within 125 µs and has 8 bits per channel to provide the transmission rate of 2,048 Mbps. The MVIP bus has 8 lines of which transmitting and receiving lines are separated.

Figure 13:
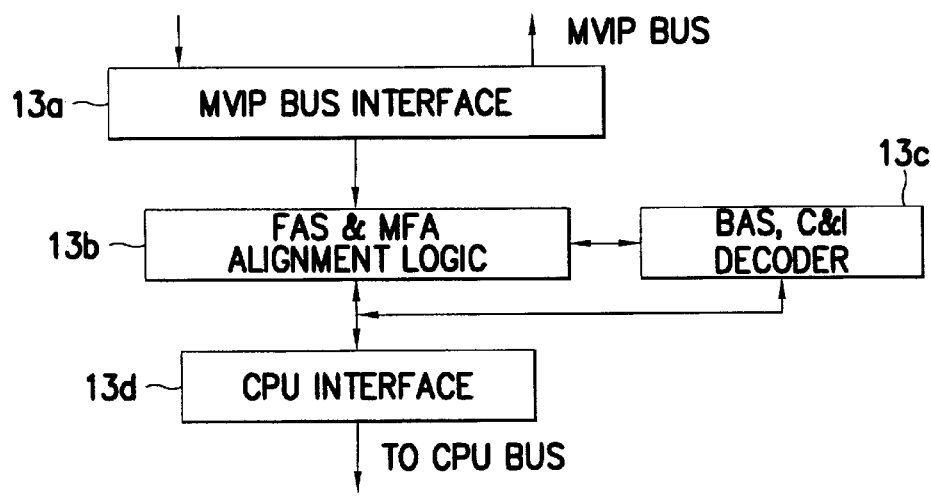
FIG. 13 is a detailed block diagram of an H.221 framing unit of the video conference control system as shown in FIG. 6.

FIG. 13 illustrates the H.221 framing unit 6c of the video conference control system as shown in FIG. 6. A MVIP bus interface 13a receives data integrated to the MVIP bus from an ISDN interface module. A FAS and MFA alignment logic 13b senses an H.221 frame structure as stipulated in the CCITT Recommendation H.221 from the received data and searches for the FAS and a multiframe synchronizing signal (MFA). A CPU interface 13d transmits BAS code having information about the video conference to the controller 6h through the CPU bus. The H.221 framing unit 6c establishes a frame structure which is capable of proceeding the video conference after an ISDN call is set up. The related information is received through the BAS and is extracted through the controller 6h so as to control other modules.

Figure 14:
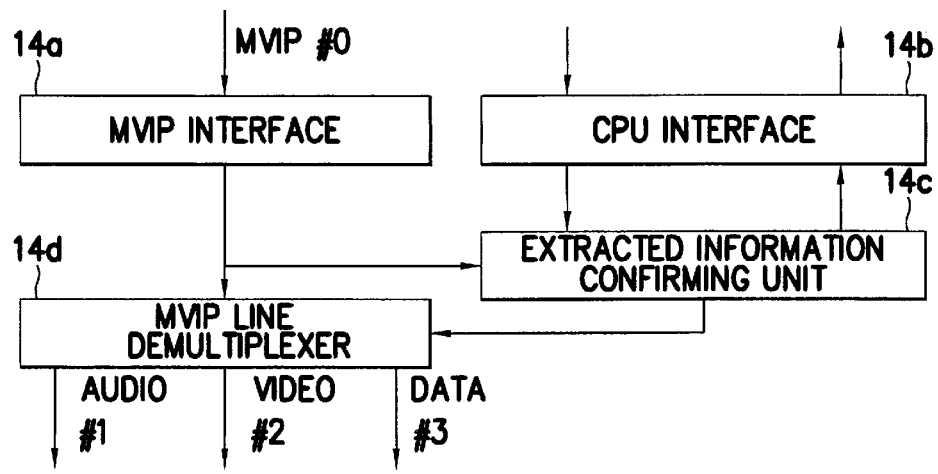
FIG. 14 is a detailed block diagram of a data separate extractor of the video conference control system as shown in FIG. 6.

Referring to FIG. 14, the data separate extractor 6d of the video conference control system as shown in FIG. 6 includes a MVIP interface 14a for receiving the ISDN data from the H.221 framing unit 6c, a CPU interface 14b for interfacing with the CPU bus, an extracted information confirming unit 14c for requesting extracted information regarding a data format and the transmission rate through the CPU interface 14b and for receiving a response from the controller 6h, and a demultiplexer 14d to extract the ISDN data to audio data, video data and general data according to the extracted information supplied from the controller 6h.

The extracted information from the controller 6h is established by a BAS code received from the H.221 framing unit 6c. Consequently, the demultiplexer 14d extracts respective independent audio data, video data and general data from the ISDN data consisting of audio, video and general data, in agreement with the BAS code.

Figure 15:
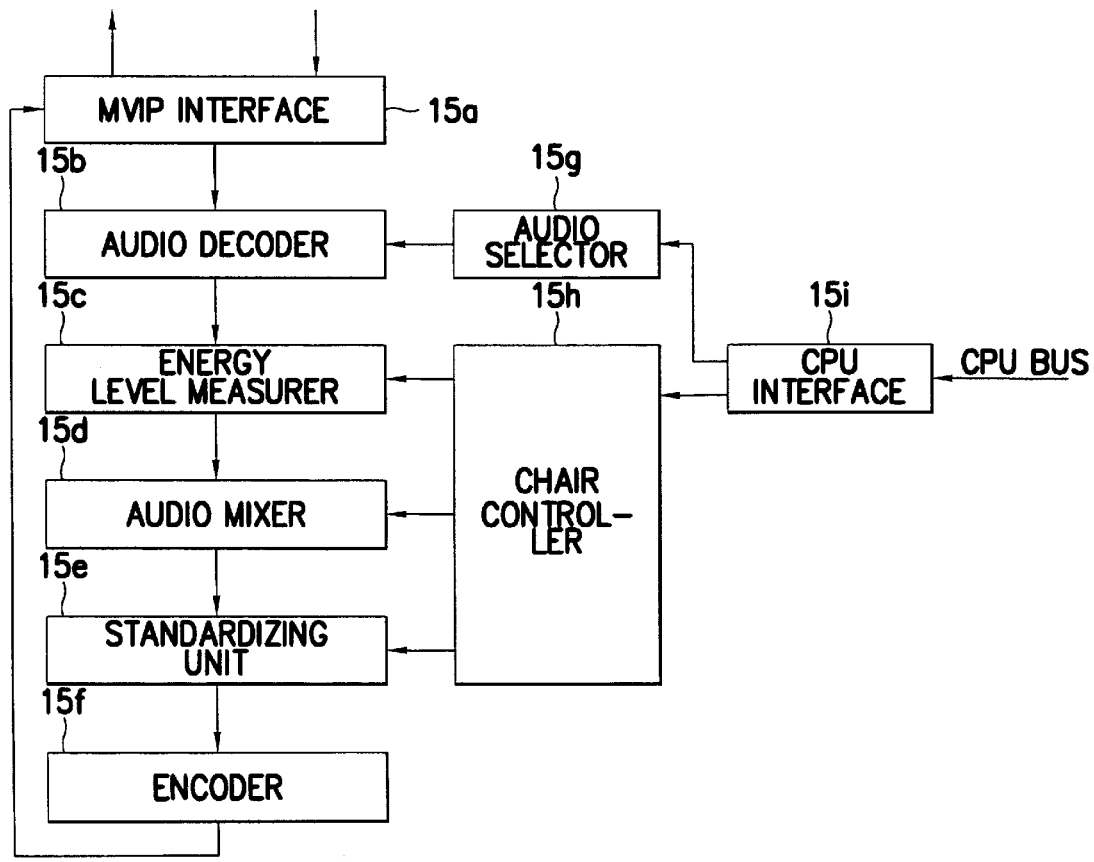
FIG. 15 is a detailed block diagram of an audio mixing unit of the video conference control system as shown in FIG. 6.

FIG. 15 illustrates the audio mixing unit 6e of the video conference control system as shown in FIG. 6. An audio MVIP interface 15 receives the audio data from the data separate extractor 6d. An audio selector 15g receives an audio form designating signal from the controller 6h through a CPU interface 15i. An audio decoder 15b converts 8-bit audio data to 14-bit linear PCM data according to an audio form, that is, PCM, ADPCM, SB-ADPCM or LD-CELP, designated by the audio form designating signal through the audio selector 15g.

An energy level measurer 15c measures an energy level of the linear PCM data corresponding to each channel to sense a speaker terminal. The energy level increases when a speaker's voice becomes louder. The three loudest voice groups are extracted and a channel corresponding to the loudest voice is judged to be a speaker's terminal. If the speaker's terminal is sensed, an audio mixer 15d mixes the extracted the three loudest voice groups with all the terminals except the speaker's terminal and generates one audio linear PCM data. The audio linear PCM data is mixed data and may include data exceeding 14 bits. A standardizing unit 15e adjusts the 14-bit or more data to data not exceeding 14 bits. The standardized audio linear PCM data is encoded to 8-bit data through an encoder 15f and loaded to the MVIP bus through the MVIP interface 15a.

There are a voice activated mode which is set on the basis of a subscriber having the loudest voice and a chair control mode. In the voice switching by the chair control mode, a terminal registered to a chair terminal has a control function and selects a voice of a specific terminal irrespective of the voice energy level. In this case, the energy measurer 15c, the audio mixer 15d and the standardizing unit 15e are not operated and the voice of the selected terminal is broadcast. The chair control mode is performed by a chair controller 15h controlled by the controller 6h through the CPU interface 15i.

Figure 16:
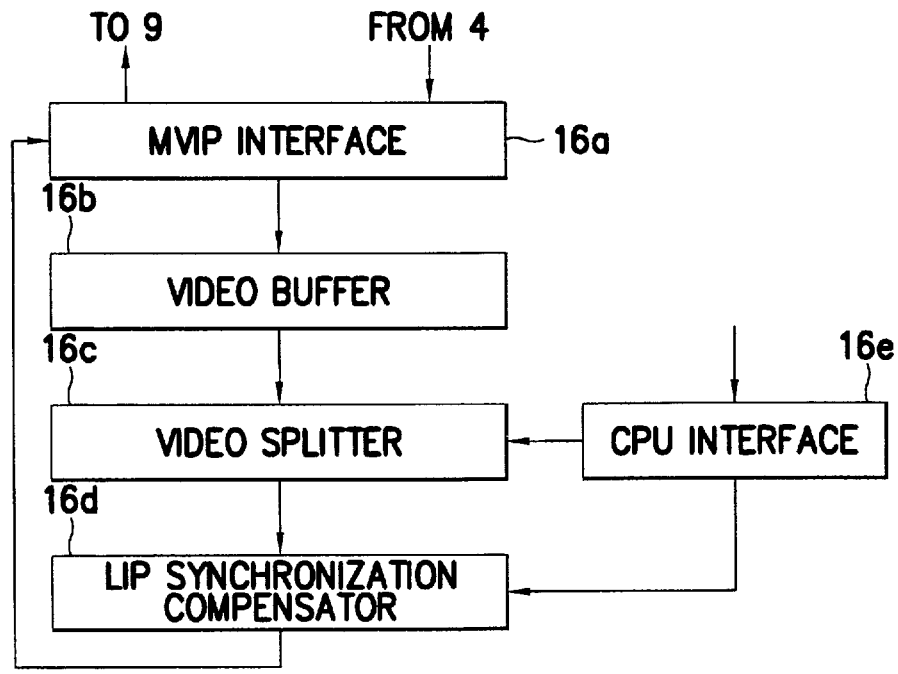
FIG. 16 is a detailed block diagram of a video switching unit of the video conference control system as shown in FIG. 6.

FIG. 16 illustrates the video switching unit 6f of the video conference control system as shown in FIG. 6. The video data received through a MVIP interface 16a from the data separate extractor 6d is temporarily stored in a video buffer 16b. A video splitter 16c analyzes screen shape form information received from the controller 6h through a CPU interface 16e. If the video split screen is selected, the video splitter 16c again combines images of three speaker's terminals having the largest energy level extracted through the audio mixing unit 6e to one screen. If the video split screen is not selected, channel information of a main speaker selected from the audio mixing unit 6e or specific channel information received from the chair terminal is received from the controller 6h to broadcast the video data to all the terminals. A lip synchronization compensator 16d compensates for lip synchronization between the audio data and video data so as to broadcast natural screen and voice.

Figure 17:
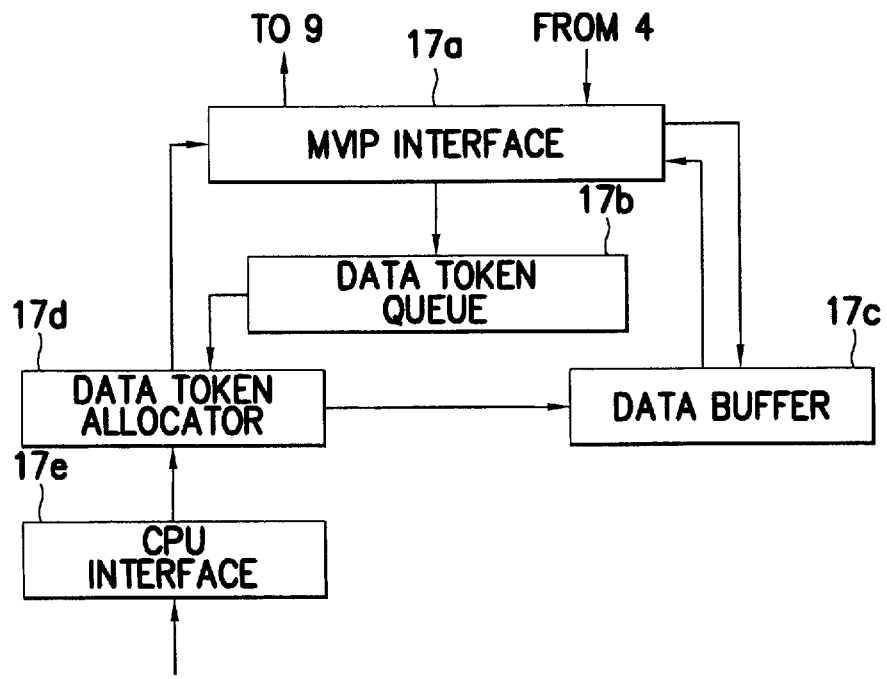
FIG. 17 is a detailed block diagram of a data processor of the video conference control system as shown in FIG. 6.

FIG. 17 illustrates the data processor 6g of the video conference control system as shown in FIG. 6. To communicate with general data, a data token should be allocated to each terminal from the MCU. To this, each terminal requests a data channel of the token before transmitting data. This request is stacked in a token queue 17b through a MVIP interface 17a. A token allocator 17d appropriately controls the token according to an instruction supplied from the controller 6h through a CPU interface 17e and allocates the token to a corresponding terminal. The terminal to which the token is allocated can transmit data to the MCU and the MCU receives the data. The received data is temporarily stored in a data buffer 17c and is supplied to a terminal which is to be transmitted through the MVIP interface 17a.

Figure 18:
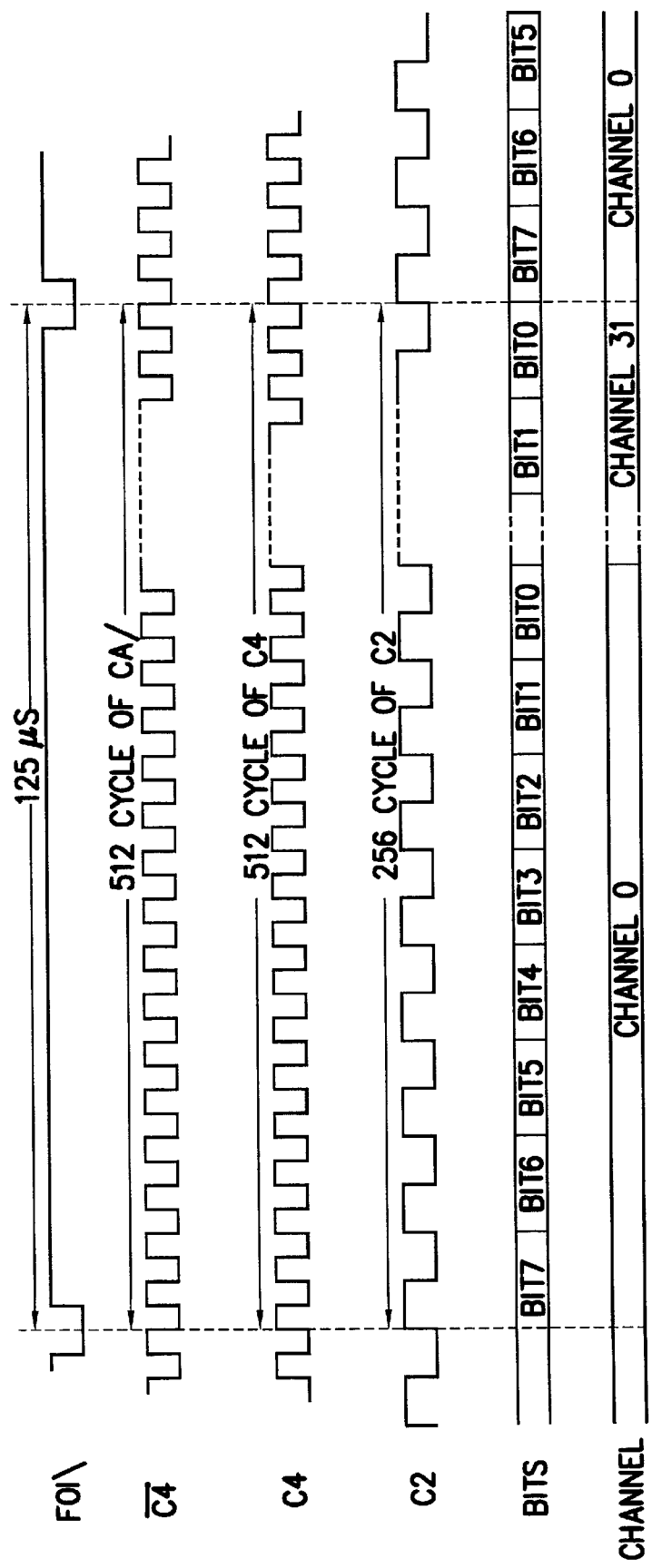
FIG. 18 is a timing chart of a MVIP bus of the video conference control system as shown in FIG. 6.

Referring to FIG. 18, a relationship between a bit allocated to a channel and a clock is illustrated on the MVIP bus. Data separated in the SAC board and the H.221 multiplexer board and data signaling interfaced in the audio mixing unit 6e and the video switching unit 6f of the video conference control system of FIG. 6 are communicated according to a MVIP format. The following Table-1 shows a pin arrangement of a MVIP connector. The MVIP bus is developed for PC/AT (ISAC) and EISA systems and supports synchronizing data of 2,048 Mbps through 16 lines for interboard communication and control. Pins DSi0–DSi7 are used for receiving data from a terminal, and DSo0–DSo7 are used for transmitting data to a terminal. C4 and C2 are system clocks of 4,096 MHz, F0I is a frame synchronizing signal of 8 MHz.

TABLE 1

| 1 | Reserved | 2 | Reserved |
|---|---|---|---|
| 3 | Reserved | 4 | Reserved |
| 5 | Reserved | 6 | Reserved |
| 7 | DSo0 | 8 | DSi0 |
| 9 | DSo1 | 10 | DSi1 |
| 11 | DSo2 | 12 | DSi2 |
| 13 | DSo3 | 14 | DSi3 |
| 15 | DSo4 | 16 | DSi4 |
| 17 | DSo5 | 18 | DSi5 |
| 19 | DSo6 | 20 | DSi6 |
| 21 | DSo7 | 22 | DSi7 |
| 23 | Reserved | 24 | Reserved |
| 25 | Reserved | 26 | Reserved |
| 27 | Reserved | 28 | Reserved |
| 29 | Reserved | 30 | Ground |
| 31 | /C4 | 32 | Ground |
| 33 | /F0 | 34 | Ground |
| 35 | C2 | 36 | Ground |
| 37 | SEC8k | 38 | Ground |
| 39 | Reserved | 40 | Reserved |

Figure 19A:
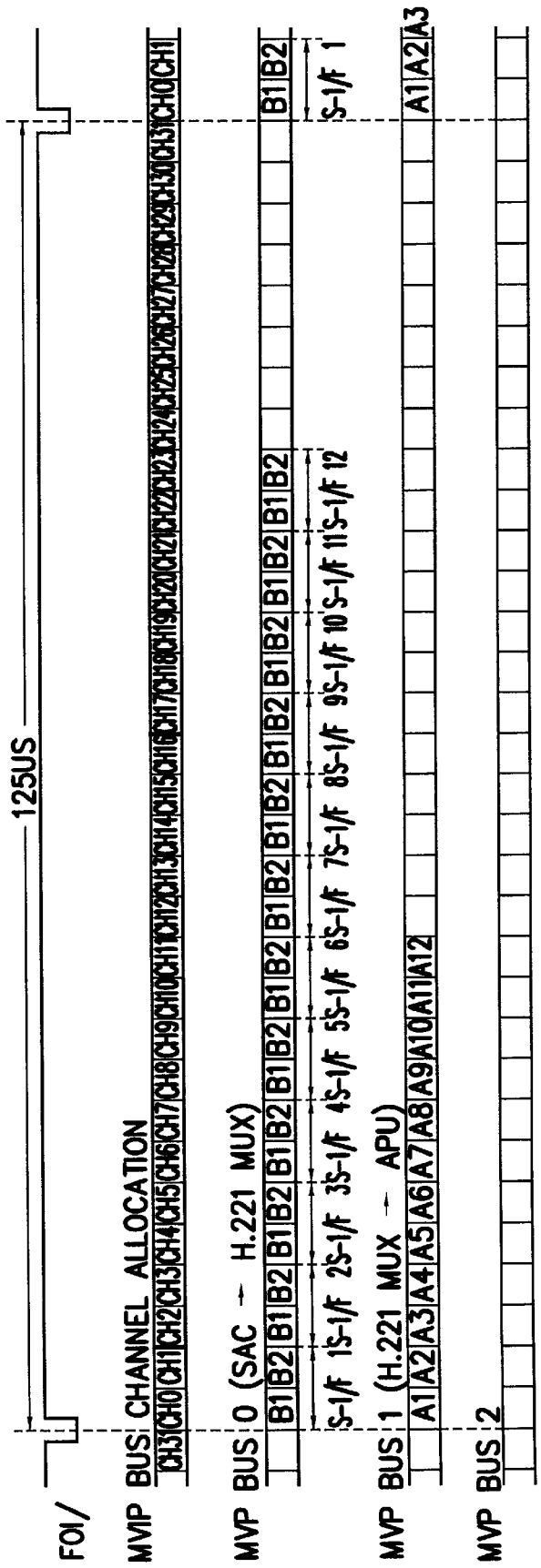
FIGS. 19A and 19B illustrate a MVIP bus channel allocation state in a video conference of one group joining twelve video conference terminals.
Figure 19B:
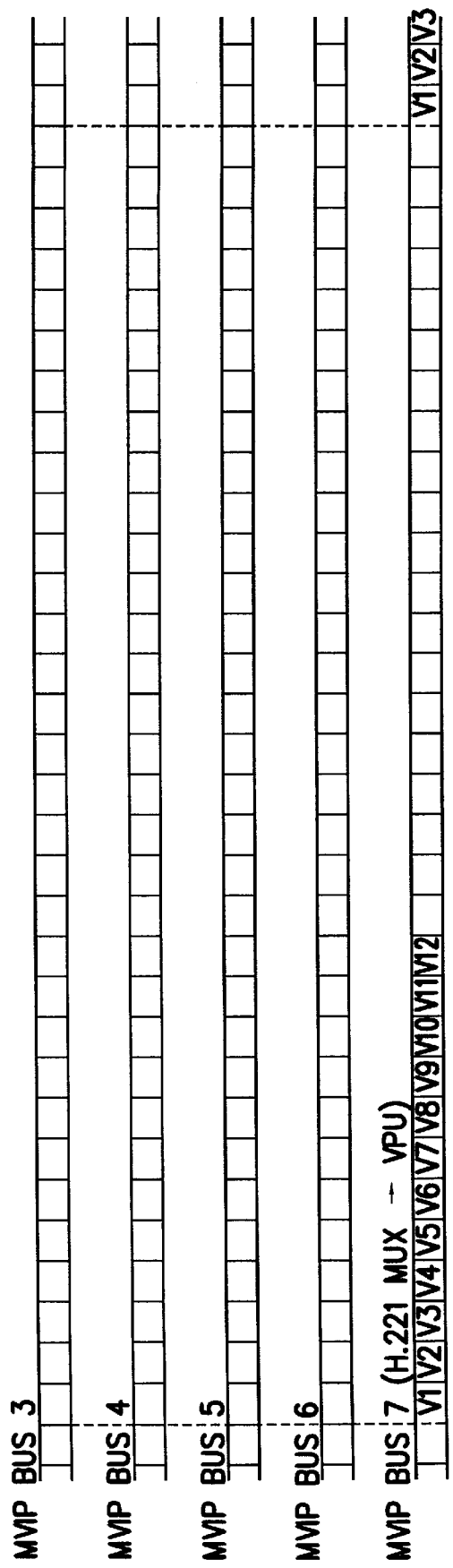
Figure 20A:
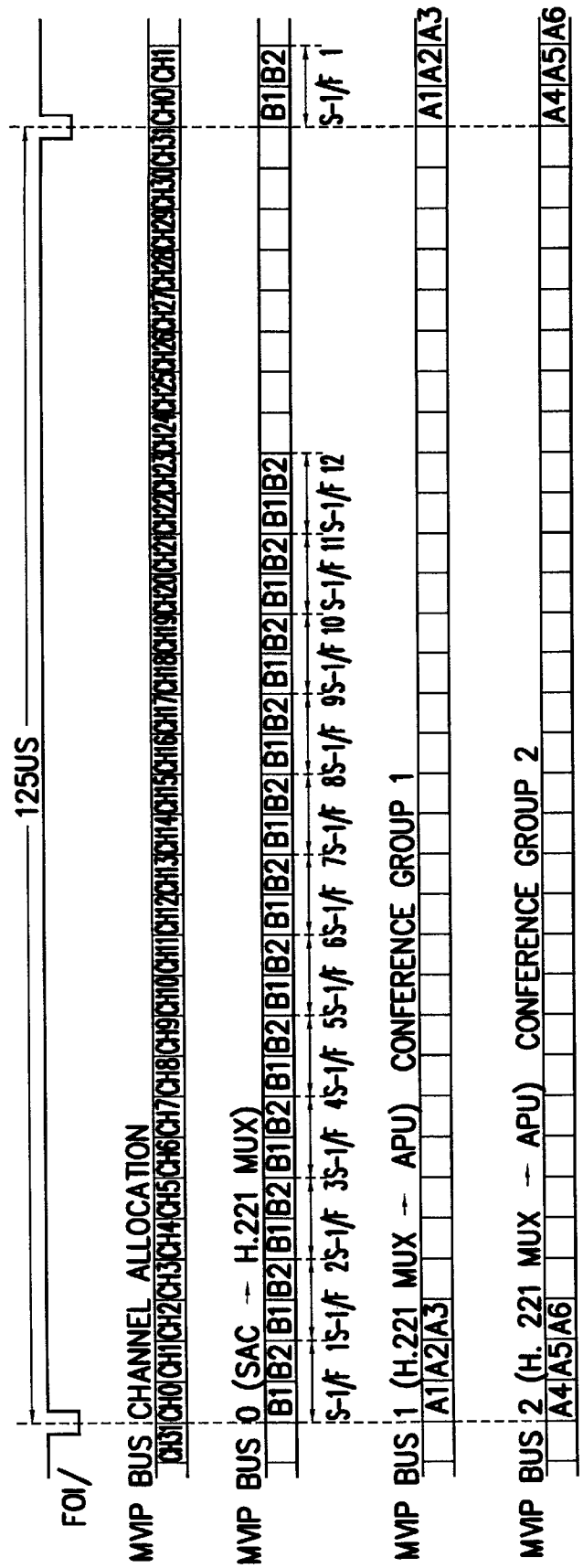
FIGS. 20A and 20B illustrate a MVIP bus channel allocation state in a conference of four groups each joining three video conference terminals.
Figure 20B:
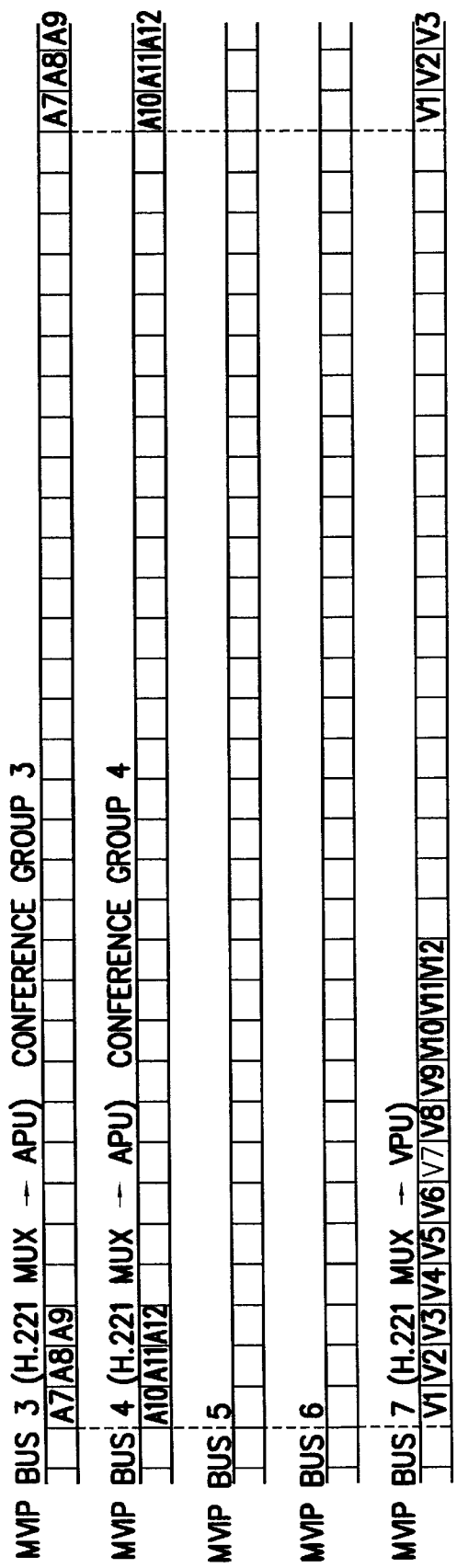

FIGS. 19A and 19B illustrate a MVIP channel allocation state in a conference of one group joining twelve (12) terminals, and FIGS. 20A and 20B illustrate a MVIP channel allocation state in a conference of four (4) groups each having three (3) terminals, respectively. As shown in FIGS. 19A, 19B, 20A and 20B, channels are allocated to a MVIP bus stream 0 and transmitted to the H.221 multiplexer board 4c of the video conference control system as shown in FIG. 4. Since one SAC includes 4-line 'S/T', and three SAC can be connected, 24 (=2B×4×3) channels can be allocated to the MVIP bus stream 0. The channel data is separated to 80 bytes per frame. Each frame has a service channel of FAS, BAS and ECS (Encryption Control signal). The H.221 multiplexer board 4c detects H.221 frame synchronization from the channel data conveyed in an H.221 framing header, that is, the MVIP bus stream 0 (DSi0), synchronizes a frame phase to MCU internal timing, and separates audio and video signals from the channel data. The separated audio data is allocated to each channel of MVIP bus stream 1—MVIP bus stream 4 (DSo1–DSo4) and transmitted to the audio mixing unit 6e. The MCU can call a video conference by connecting twelve (12) terminals. Therefore, the video conference can be called in groups by 3, 4, 5 or 6 ports, but the number of terminals does not exceed twelve (12). In a single video conference mode, the channel is allocated to the MVIP bus stream 1 as shown in FIG. 20. A conference group can be selected up to 6 terminals from 3 terminals according to the request of a video terminal.

Figure 21:
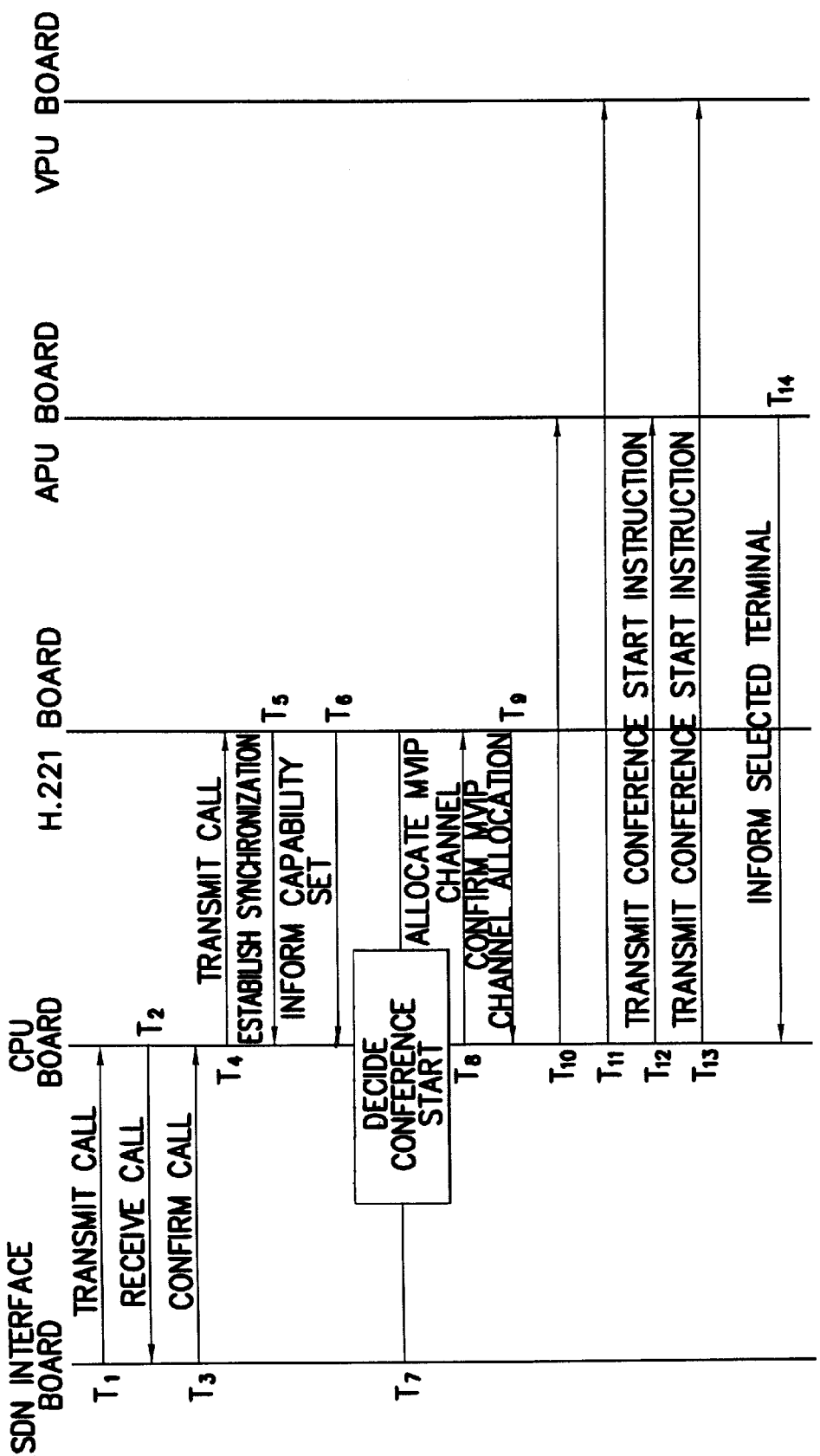
FIG. 21 illustrates a MVIP bus channel allocation sequence of the video conference control system as shown in FIG. 6.

FIG. 21 illustrates a MVP bus channel allocation sequence of the video conference control system constructed according to the present invention. Procedures T1–T7 performing an ISDN call are in agreement with the CCITT Recommendations H.221, H.320, H.242, H.243, etc. As shown in FIG. 21, only timing procedures related to the MVIP bus allocation are described. If a call is received from the ISDN interface board at T1, the CPU board searches for a time slot which is not used for a MVIP bus (MVIP0) allocated to the ISDN board and informs the ISDN board through the ISDN interface board of such a time slot at T2. If a message for call confirmation is received from the ISDN interface board at T3, the CPU board informs the H.221 board of a time slot number and a new call at T4. The H.221 board establishes synchronization from a given time slot at T5, and extract a capability set from the bus to inform the CPU board at T6. After repeating the timing procedures T1–T6, if conference start is decided from the CPU interface board at T7, MVIP bus line and channel are allocated to the time slots contained in the conference at T8. The video data is integrated in one line or two lines and the audio data can allocate one MVIP bus for one conference. The H.221 board confirms the MVIP channel allocation and informs the CPU board at T9. Meanwhile, if the timing procedure at T8 is completed, the capability set for each channel is given to the APU and VPU boards at T10 and T11. If the conference start instruction is given at T12 and T13, the APU and VPU boards process data by the given capability set and convey the data to a corresponding MVIP bus and channel. The APU board measures the audio level periodically and informs the CPU board of three terminals having the largest audio level at T14. Each time conference configuration or terminal's capability is changed, for example, conference participation of a new terminal or a video split screen, only the necessary time procedures out of T8–T11 are implemented and T12 and T13 are performed. The above timing procedures are implemented through the AT bus.

As described above, the video conference control system constructed according to the principles of the present invention has a PC/MVIP bus structure which is simple and serves to facilitate the audio mixing and video switching processing of ISDN data received from the ISDN. Moreover, since the ISDN interface is used in lieu of a conventional leased line, installation cost of line interface can be reduced. Further, since a moving picture terminal can be connected under international standardization H-series, a remote multipoint video conference can efficiently be accomplished.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A video conference control system for controlling a multipoint video conference system by simultaneously connecting three or more terminals using an integrated services digital network, said video conference control system comprising:

main control means for controlling operation of a video conference, including main speaker's channel information and specific channel information received from a chair terminal;

a data bus for synchronously transmitting and receiving data and a control signal between the terminals;

multiplexing means for detecting a frame synchronization from data received through said data bus, synchronizing a phase of detected frame synchronization and separating audio and video signals from the received data;

video processing means for transmitting the separated video signal to a selected terminal according to an audio level, and for alternatively processing the separated video signal to a video split screen; and audio processing means for selecting the terminals of a prescribed number having the loudest voice to sum corresponding audio data, and for alternatively processing conference data per a prescribed group of terminals.

2. The video conference control system of claim 1, wherein said multiplexing means comprises:

a bus interface for receiving data from said integrated services digital network;

a synchronizing signal detector for sensing a H.221 frame structure from the received data and searching for a frame synchronizing signal and a multiframe synchronizing signal; and a central processing unit interface for transmitting a bit-rate allocation signal code in which information on a video conference is allocated to said main control means through a central processing unit according to the detected synchronizing signal.

3. The video conference control system of claim 2, wherein said multiplexing means further comprises:

data extracting means for receiving the data from the integrated services digital network through said data bus, requesting extraction of information on a data format and a transmission rate from said main control means, and separating the data received from the integrated services digital network into audio data, video data and general data.

4. The video conference control system of claim 3, wherein said video processing means comprises:

a video buffer for temporarily storing video data received through said data bus from said multiplexing means; and a video splitter for receiving and analyzing screen shape information from said main control means, and for combining an image of a speaker terminal having the largest energy level to one screen when a video split screen is selected.

5. The video conference control system of claim 4, wherein said video processing means further comprises:

means for receiving the main speaker's channel information or specific channel information received from the chair terminal, and broadcasting video data to all terminals when the video split screen is not selected.

6. The video conference control system of claim 4, wherein said video processing means further comprises:

lip synchronizing means for compensating for lip synchronization between audio data and video data so as to broadcast natural screen and voice.

7. The video conference control system of claim 1, wherein said audio processing means comprises:

an audio selector for receiving an audio format designating signal from said main control means through a central processing unit interface;

an audio decoder for converting audio data of a first prescribed bit to linear pulse code modulation data of a second prescribed bit according to said audio format designating signal from said audio selector;

an energy level measurer for measuring an energy level of said linear pulse code modulation data corresponding to each channel to decide a speaker terminal;

an audio mixer for mixing the extracted loudest voice group of a prescribed number to all the terminals except the terminal having the largest energy level to generate audio linear pulse code modulation data; and an encoder for encoding the mixed audio linear pulse code modulation data to data having an original bit numbers for loading to said data bus.

8. The video conference control system of claim 7, wherein said audio processing means further comprises:

standardizing unit for adjusting exceed data contained in the mixed audio linear pulse code modulation data to a prescribed bit or less.

9. The video conference control system of claim 1, further comprising a PC bus for 1 exchanging data and a control signal.

10. The video conference control system of claim 1, further comprising S interface means for transmitting data between terminals to said data bus.

11. A video conference control system for controlling a multipoint video conference system including a plurality of terminals provided in a plurality of conference rooms operably connected to an integrated services digital network for establishing a video conference between at least three terminals, said video conference control system comprising:

ISDN interface means connected to the integrated services digital network, for enabling an ISDN audio and video connection between terminals;

main control means for controlling a video conference between at least three terminals upon establishing an ISDN audio and video connection between the terminals;

a data bus for synchronously transmitting and receiving ISDN data and a control signal between the terminals; multiplexing means for detecting a frame synchronization from the ISDN data received through said data bus, synchronizing a phase of detected frame synchronization and separating audio and video signals from the received ISDN data;

video processing means for transmitting the separated video signal to a selected terminal according to an audio level, and for alternatively processing the separated video signal to a video split screen; and audio processing means for selecting the terminals of a prescribed number having the loudest voice to sum corresponding audio data, and for alternatively processing conference data per a prescribed group of terminals.

12. A video conference control system for controlling a multipoint video conference system including a plurality of terminals provided in a plurality of conference rooms operably connected to an integrated services digital network for establishing a video conference with at least three participating terminals, said video conference control system comprising:

an interface connected to the integrated services digital network, for accessing the integrated services digital network for an audio and video connection between participating terminals;

a main controller for controlling the audio and video connection between the participating terminals;

an internal bus connected to said interface, for transporting conference data including audio data and video data from the integrated services digital network, and control data within said video conference control system, and for enabling the audio and video connection between the participating terminals;

multiplexing and demultiplexing means interfaced with said internal bus, for establishing frame synchronization with the conference data received through said data bus, for separating said audio and video data from the received conference data, and for multiplexing processed conference data including processed video and audio data to be transmitted through said integrated services digital network;

a video processor interfaced with said internal bus, for processing said video data separated from the received conference data of a designated terminal and generating said processed video data to be transmitted to the participating terminals via said integrated services digital network; and an audio processor interfaced with said internal bus, for processing said audio data separated from the received conference data of all participating terminals and generating said processed audio data to be transmitted to the participating terminals via said integrated services digital network said audio processor comprising:

an internal bus interface for receiving said audio data separated from said conference data received from said integrated services digital network via said internal bus;

a decoder for converting said audio data of a first prescribed bit to pulse-code-modulation data of a second prescribed bit according to a selected audio format;

an energy level measurer for measuring an energy level of said pulse-code-modulation data corresponding to each channel to determine a speaker terminal;

a mixer for mixing said audio data from the loudest voice group of a prescribed number from all the participating terminals except the participating terminal having the largest energy level to generate audio pulse-code-modulation data;

a standardize unit for adjusting said audio pulse-code-modulation data for transmission via said integrated services digital network; and an encoder for encoding the adjusted audio pulse-code-modulation data prior to loading to said internal bus for transmission via said integrated services digital network.

13. The video conference control system of claim 12, wherein said multiplexing and demultiplexing means comprises:

an internal bus interface for receiving said conference data from said integrated services digital network via said internal bus;

a synchronization detector for detecting a communication frame from received conference data as stipulated in CCITT Recommendation H.221 to confirm reception of said conference data;

means for confirming the received conference data in accordance with a bit-rate allocation code containing therein information regarding a video conference;

a demultiplexer for separating said audio data, said video data and general data from the received conference data; and a multiplexer for multiplexing processed audio data, processed video data and processed general data for transmission via said integrated services digital network.

14. The video conference control system of claim 12, further comprising a private automatic branch exchange connected to the integrated services digital network for enabling establishment of the video conference of at least three participating terminals within a private automatic branch exchange region.

15. The video conference control system of claim 12, further comprising a private automatic branch exchange connected to the integrated services digital network for enabling establishment of the video conference of at least one participating terminal within a private automatic branch exchange region with the participating terminals outside said private automatic branch exchange region.

16. A video conference control system comprising:

an interface connected to an integrated services digital network, for enabling audio and video connections between participating terminals requesting a video conference;

a main controller for controlling the audio and video connections between the participating terminals;

an internal bus connected to said interface for transporting conference data including audio data and video data from the integrated services digital network, and control data within said video conference control system and for enabling the audio and video connections between the participating terminals;

multiplexing and demultiplexing means interfaced with said internal bus, for establishing frame synchronization with the conference data received through said data bus for separating said audio and video data from the received conference data, and for multiplexing processed conference data including processed video and audio data to be transmitted through said integrated services digital network;

an audio processor interfaced with said internal bus, for processing said audio data separated from the received conference data of all participating terminals and generating said processed audio data to be transmitted to the participating terminals via said integrated services digital network, and a video processor interfaced with said internal bus, for processing said video data separated from the received conference data of a designated terminal and generating said processed video data to be transmitted to the participating terminals via said integrated services digital network, said video processor comprising:

an internal bus interface for receiving said video data separated from said conference data received from said integrated services digital network via said internal bus;

a buffer for temporarily storing said video data separated from the conference data received through said internal bus;

a video splitter for analyzing screen shape information from said main controller, and for combining images of speaker terminals of a prescribed number having a largest energy level into a single screen for a visual display when a video split screen is selected by a participant from one of the participating terminals;

means for receiving a main speaker's channel information and for alternatively receiving specific channel information received from a specific participating terminal so as to broadcast said processed video data to all participating terminals when said video split screen is not selected; and a lip synchronizing compensator for compensating for maintaining lip synchronization between said audio data and said video data so as to broadcast said processed audio data and said video data in natural screen and voice.

17. The video conference control system of claim 16, wherein said audio processor comprises:

an internal bus interface for receiving said audio data separated from said conference data received from said integrated services digital network via said internal bus;

a decoder for converting said audio data of a first prescribed bit to pulse-code-modulation data of a second prescribed bit according to a selected audio format;

an energy level measurer for measuring an energy level of said pulse-code-modulation data corresponding to each channel to determine a speaker terminal;

a mixer for mixing said audio data from the loudest voice group of a prescribed number from all the participating terminals except the participating terminal having the largest energy level to generate audio pulse-code-modulation data;

a standardize unit for adjusting said audio pulse-code-modulation data for transmission via said integrated services digital network; and an encoder for encoding the adjusted audio pulse-code-modulation data prior to loading to said internal bus for transmission via said integrated services digital network.

18. The video conference control system of claim 17, wherein said audio processor further comprises a chair controller for, upon activation of a chair control mode, deactivating operation of said energy level measurer, said mixer, and said standardize unit, and for enabling said audio data of a designated terminal for transmission via said integrated services digital network regardless of the energy level corresponding to each channel of the participating terminals.

19. The video conference control system of claim 18, further comprising a private automatic branch exchange connected to the integrated services digital network for enabling establishment of the video conference of at least three participating terminals within a private automatic branch exchange region.

20. The video conference control system of claim 18, further comprising a private automatic branch exchange connected to the integrated services digital network for enabling establishment of the video conference of at least one participating terminal within a private automatic branch exchange region with the participating terminals outside said private automatic branch exchange region.

21. A video conference system, comprising:

a plurality of terminals provided in a plurality of conference rooms operably connected to an integrated services digital network for establishing a video conference with at least three participating terminals; and a video conference control device for controlling the video conference of at least three participating terminals via said integrated services digital network, said video conference control device comprising:

a main controller for controlling audio and video connection between the participating terminals;

an internal bus for transporting conference data including audio data and video data from the integrated services digital network, and control data within said video conference control system, and for enabling the audio and video connection between the participating terminals;

means for establishing frame synchronization with the conference data received through said data bus, for separating said audio and video data from the received conference data, and for multiplexing processed conference data including processed video and audio data to be transmitted through said integrated services digital network;

a video processor for processing said video data separated from the received conference data of a designated terminal and generating said processed video data to be transmitted to the participating terminals via said integrated services digital network; and an audio processor for processing said audio data separated from the received conference data of all participating terminals and generating said processed audio data to be transmitted to the participating terminals via said integrated services digital network, said audio processor comprising:

an internal bus interface for receiving said audio data separated from said conference data received from said integrated services digital network via said internal bus;

a decoder for converting said audio data of a first prescribed bit to pulse-code-modulation data of a second prescribed bit according to a selected audio format;

an energy level measurer for measuring an energy level of said pulse-code-modulation data corresponding to each channel to determine a speaker terminal;

a mixer for mixing said audio data from the loudest voice group of a prescribed number from all the participating terminals except the participating terminal having the largest energy level to generate audio pulse-code-modulation data, a standardize unit for adjusting said audio pulse-code-modulation data for transmission via said integrated services digital network; and an encoder for encoding the adjusted audio pulse-code-modulation data prior to loading to said internal bus for transmission via said integrated services digital network.

22. The video conference control system of claim 21, wherein said means for establishing said frame synchronization comprises:

an internal bus interface for receiving said conference data from said integrated services digital network via said internal bus;

a synchronization detector for detecting a communication frame from received conference data to confirm reception of said conference data;

means for confirming the received conference data in accordance with a bit-rate allocation code containing therein information regarding a video conference;

a demultiplexer for separating said audio data, said video data and general data from the received conference data; and a multiplexer for multiplexing processed audio data, processed video data and processed general data for transmission via said integrated services digital network.

23. The video conference control system of claim 21, further comprising a private automatic branch exchange connected to the integrated services digital network for enabling establishment of the video conference of at least three participating terminals within a private automatic branch exchange region.

24. A video conference control system for controlling a video conference of at least three participating terminals via an integrated services digital network comprising:

a main controller for controlling audio and video connection between the participating terminals;

an internal bus for transporting conference data including audio data and video data from the integrated services digital network, and control data within said video conference control system, and for enabling the audio and video connection between the participating terminals;

means for establishing frame synchronization with the conference data received through said data bus, for separating said audio and video data from the received conference data, and for multiplexing processed conference data including processed video and audio data to be transmitted through said integrated services digital network;

an audio processor for processing said audio data separated from the received conference data of all participating terminals and generating said processed audio data to be transmitted to the participating terminals via said integrated services digital network;

a video processor for processing said video data separated from the received conference data of a designated terminal and generating said processed video data to be transmitted to the participating terminals via said integrated services digital network, said video processor comprising:

an internal bus interface for receiving said video data separated from said conference data received from said integrated services digital network via said internal bus;

a buffer for temporarily storing said video data separated from the conference data received through said internal bus;

a video splitter for analyzing screen shape information from said main controller, and for combining images of speaker terminals of a prescribed number having a largest energy level into a single screen for a visual display when a video split screen is selected by a participant from one of the participating terminals;

means for receiving a main speaker's channel information and for alternatively receiving specific channel information received from a specific participating terminal so as to broadcast said processed video data to all participating terminals when said video split screen is not selected; and a lip synchronizing compensator for compensating for maintaining lip synchronization between said audio data and said video data so as to broadcast said processed audio data and said video data in natural screen and voice.

25. The video conference control system of claim 24, wherein said audio processor comprises:

an internal bus interface for receiving said audio data separated from said conference data received from said integrated services digital network via said internal bus;

a decoder for converting said audio data of a first prescribed bit to pulse-code-modulation data of a second prescribed bit according to a selected audio format;

an energy level measurer for measuring an energy level of said pulse-code-modulation data corresponding to each channel to determine a speaker terminal;

a mixer for mixing said audio data from the loudest voice group of a prescribed number from all the participating terminals except the participating terminal having the largest energy level to generate audio pulse-code-modulation data;

a standardize unit for adjusting said audio pulse-code-modulation data for transmission via said integrated services digital network; and an encoder for encoding the adjusted audio pulse-code-modulation data prior to loading to said internal bus for transmission via said integrated services digital network.

26. The video conference control system of claim 25, wherein said audio processor further comprises a chair controller for, upon activation of a chair control mode, deactivating operation of said energy level measurer, said mixer, and said standardize unit, and for enabling said audio data of a designated terminal for transmission via said integrated services digital network regardless of the energy level corresponding to each channel of the participating terminals.

* * * * *